US008107618B2

(12) United States Patent
Binder et al.

(10) Patent No.: US 8,107,618 B2
(45) Date of Patent: Jan. 31, 2012

(54) METHOD AND SYSTEM FOR PROVIDING DC POWER ON LOCAL TELEPHONE LINES

(75) Inventors: Yehuda Binder, Hod Hasharon (IL); Ami Hazani, Ra'anana (IL); Semion Kofman, Holon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 1401 days.

(21) Appl. No.: 11/471,665

(22) Filed: Jun. 21, 2006

(65) Prior Publication Data

US 2006/0233354 A1     Oct. 19, 2006

Related U.S. Application Data

(63) Continuation of application No. 10/403,526, filed on Apr. 1, 2003, now Pat. No. 7,317,793.

(30) Foreign Application Priority Data

Jan. 30, 2003    (IL) .......................................... 154234

(51) Int. Cl.
     *H04M 1/00*          (2006.01)
(52) U.S. Cl. ............... 379/413; 379/387.01; 379/399.01
(58) Field of Classification Search ............. 379/387.01, 379/399.01, 413
See application file for complete search history.

(56) References Cited

U.S. PATENT DOCUMENTS

| 404,721 | A | 6/1889 | Messer |
| 405,422 | A | 6/1889 | Law et al. |
| 2,298,435 | A | 10/1942 | Tunick |
| 2,568,342 | A | 9/1951 | Koehler et al. |
| 2,680,162 | A | 6/1954 | Brehm et al. |
| 3,406,344 | A | 10/1968 | Hopper |
| 3,511,936 | A | 5/1970 | Saltzberg |
| 3,529,088 | A | 9/1970 | Hauer |
| 3,539,727 | A | 11/1970 | Pasternack |
| 3,651,471 | A | 3/1972 | Hasselwood et al. |
| 3,699,523 | A | 10/1972 | Percher |
| 3,723,653 | A | 3/1973 | Tatsuzawa |
| 3,835,334 | A | 9/1974 | Notteau |

(Continued)

FOREIGN PATENT DOCUMENTS

EP            0848533        6/1998

(Continued)

OTHER PUBLICATIONS

Strassberg, Dan; "Home Automation Buses: Protocols Really Hit Home"; EDN Design Feature, Apr. 13, 1995 (9 pages).

(Continued)

*Primary Examiner* — Walter F Briney, III
(74) *Attorney, Agent, or Firm* — Browdy and Neimark, PLLC

(57) ABSTRACT

A system for providing DC power on local telephone lines, such as telephone lines in a building or office, for powering devices and circuitry associated with communications over those telephone lines, as well as other functions. Desired voltage and power levels are supplied over local telephone lines by separating the DC power component from the central office or private branch exchange with a DC blocking filter while passing all AC telephony signals. A distinct DC power is then imposed over the telephone line for powering both the telephony service as well as other loads. Conventional telephone off-hook detection is simulated for compatibility with the central office or private branch exchange. The functions required may be integrated, partially or fully within a telephone outlet.

18 Claims, 12 Drawing Sheets

U.S. PATENT DOCUMENTS

| | | |
|---|---|---|
| 3,870,822 A | 3/1975 | Matthews |
| 3,872,253 A | 3/1975 | Jurschak |
| 3,873,771 A | 3/1975 | Kleinerman et al. |
| 3,875,339 A | 4/1975 | Gruen et al. |
| 3,922,490 A | 11/1975 | Pettis |
| 3,937,889 A | 2/1976 | Bell, III et al. |
| 3,968,333 A | 7/1976 | Simokat et al. |
| 3,992,589 A | 11/1976 | Kuegler |
| 4,008,369 A | 2/1977 | Theurer et al. |
| 4,035,838 A | 7/1977 | Bassani et al. |
| 4,054,910 A | 10/1977 | Chou et al. |
| 4,171,467 A | 10/1979 | Evenchik |
| 4,197,431 A | 4/1980 | Vis |
| 4,206,320 A | 6/1980 | Keasler et al. |
| 4,232,200 A | 11/1980 | Hestad et al. |
| 4,241,243 A | 12/1980 | Ball |
| 4,302,629 A | 11/1981 | Foulkes et al. |
| 4,303,993 A | 12/1981 | Panepinto, Jr. et al. |
| 4,328,579 A | 5/1982 | Hashimoto et al. |
| 4,330,687 A | 5/1982 | Foulkes et al. |
| 4,332,980 A | 6/1982 | Reynolds et al. |
| 4,335,464 A | 6/1982 | Armstrong et al. |
| 4,339,816 A | 7/1982 | Reed |
| 4,373,117 A | 2/1983 | Pierce |
| 4,378,470 A | 3/1983 | Murto et al. |
| 4,381,427 A | 4/1983 | Cheal et al. |
| 4,387,271 A | 6/1983 | Artom |
| 4,388,489 A | 6/1983 | Wigan et al. |
| 4,390,986 A | 6/1983 | Moses |
| 4,393,508 A | 7/1983 | Boudault |
| 4,395,590 A | 7/1983 | Pierce et al. |
| 4,415,774 A | 11/1983 | Driver |
| 4,417,099 A | 11/1983 | Pierce |
| 4,425,642 A | 1/1984 | Moses et al. |
| 4,431,869 A | 2/1984 | Sweet |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,449,218 A | 5/1984 | Strehl |
| 4,456,985 A | 6/1984 | Carsten et al. |
| 4,456,986 A | 6/1984 | Carsten et al. |
| 4,459,434 A | 7/1984 | Benning et al. |
| 4,485,400 A | 11/1984 | Lemelson et al. |
| 4,493,092 A | 1/1985 | Adams |
| 4,493,948 A | 1/1985 | Sues et al. |
| 4,500,751 A | 2/1985 | Darland et al. |
| 4,506,387 A | 3/1985 | Walter |
| 4,507,721 A | 3/1985 | Yamano et al. |
| 4,507,793 A | 3/1985 | Adams |
| 4,521,881 A | 6/1985 | Stapleford et al. |
| 4,523,307 A | 6/1985 | Brown et al. |
| 4,528,422 A | 7/1985 | Cupani |
| 4,543,450 A | 9/1985 | Brandt |
| 4,546,212 A | 10/1985 | Crowder, Sr. |
| 4,551,721 A | 11/1985 | Kozlik |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,533 A | 3/1986 | Pierce |
| 4,578,535 A | 3/1986 | Simmons |
| 4,578,537 A | 3/1986 | Faggin et al. |
| 4,578,540 A | 3/1986 | Borg et al. |
| 4,580,276 A | 4/1986 | Andruzzi, Jr. et al. |
| 4,580,291 A | 4/1986 | Ab Der Halden |
| 4,583,214 A | 4/1986 | Miyashita et al. |
| 4,584,690 A | 4/1986 | Cafiero et al. |
| 4,592,069 A | 5/1986 | Redding |
| 4,593,389 A | 6/1986 | Wurzburg et al. |
| 4,597,077 A | 6/1986 | Nelson et al. |
| 4,604,741 A | 8/1986 | Barsellotti |
| 4,608,686 A | 8/1986 | Barsellotti |
| 4,642,607 A | 2/1987 | Strom et al. |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,665,544 A | 5/1987 | Honda et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,677,646 A | 6/1987 | Dodds et al. |
| 4,679,227 A | 7/1987 | Hughes-Hartogs |
| 4,691,344 A | 9/1987 | Brown et al. |
| 4,709,412 A | 11/1987 | Seymour et al. |
| 4,724,435 A | 2/1988 | Moses et al. |
| 4,731,821 A | 3/1988 | Jackson, III |
| 4,733,380 A | 3/1988 | Havira |
| 4,733,389 A | 3/1988 | Puvogel |
| 4,734,932 A | 3/1988 | Lott |
| 4,740,963 A | 4/1988 | Eckley |
| 4,742,538 A | 5/1988 | Szlam |
| 4,754,326 A | 6/1988 | Kram et al. |
| 4,757,495 A | 7/1988 | Decker et al. |
| 4,757,497 A | 7/1988 | Beierle et al. |
| 4,761,646 A | 8/1988 | Choquet et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,772,870 A | 9/1988 | Reyes |
| 4,776,006 A | 10/1988 | Comerford et al. |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,803,719 A | 2/1989 | Ulrich |
| 4,807,225 A | 2/1989 | Fitch |
| 4,815,106 A | 3/1989 | Propp et al. |
| 4,821,319 A | 4/1989 | Middleton et al. |
| 4,825,435 A | 4/1989 | Amundsen et al. |
| 4,837,799 A | 6/1989 | Prohs et al. |
| 4,839,743 A | 6/1989 | Best et al. |
| 4,849,811 A | 7/1989 | Kleinerman |
| 4,852,151 A | 7/1989 | Dittakavi et al. |
| 4,866,602 A | 9/1989 | Hall |
| 4,882,747 A | 11/1989 | Williams |
| 4,885,747 A | 12/1989 | Foglia |
| 4,885,766 A | 12/1989 | Yasuoka et al. |
| 4,888,795 A | 12/1989 | Ando et al. |
| 4,890,316 A | 12/1989 | Walsh et al. |
| 4,893,326 A | 1/1990 | Duran et al. |
| 4,896,349 A | 1/1990 | Kubo et al. |
| 4,901,218 A | 2/1990 | Cornwell |
| 4,901,342 A | 2/1990 | Jones |
| 4,903,292 A | 2/1990 | Dillon |
| 4,914,688 A | 4/1990 | Kobayashi et al. |
| 4,918,688 A | 4/1990 | Krause et al. |
| 4,918,690 A | 4/1990 | Markkula, Jr. et al. |
| 4,924,492 A | 5/1990 | Gitlin et al. |
| 4,932,022 A | 6/1990 | Keeney et al. |
| 4,932,047 A | 6/1990 | Emmons et al. |
| 4,939,728 A | 7/1990 | Markkula, Jr. et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlin et al. |
| 4,969,147 A | 11/1990 | Markkula, Jr. et al. |
| 4,973,954 A | 11/1990 | Schwarz |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,985,892 A | 1/1991 | Camarata |
| 4,989,081 A | 1/1991 | Miyagawa et al. |
| 4,996,709 A | 2/1991 | Heep et al. |
| 5,010,399 A | 4/1991 | Goodman et al. |

| Patent | Date | Inventor |
|---|---|---|
| 5,014,308 A | 5/1991 | Fox |
| 5,018,138 A | 5/1991 | Twitty et al. |
| 5,032,819 A | 7/1991 | Sakuragi et al. |
| 5,033,062 A | 7/1991 | Morrow et al. |
| 5,034,883 A | 7/1991 | Donaldson et al. |
| 5,036,513 A | 7/1991 | Greenblatt |
| 5,051,822 A | 9/1991 | Rhoades |
| 5,065,133 A | 11/1991 | Howard |
| 5,089,886 A | 2/1992 | Grandmougin |
| 5,090,052 A | 2/1992 | Nakajima et al. |
| 5,095,497 A | 3/1992 | Aman et al. |
| 5,111,497 A | 5/1992 | Bliven et al. |
| 5,113,498 A | 5/1992 | Evan et al. |
| 5,125,077 A | 6/1992 | Hall |
| 5,144,544 A | 9/1992 | Jenneve et al. |
| 5,148,144 A | 9/1992 | Sutterlin et al. |
| 5,157,711 A | 10/1992 | Shimanuki |
| 5,175,764 A | 12/1992 | Patel et al. |
| 5,181,240 A | 1/1993 | Sakuragi et al. |
| 5,210,788 A | 5/1993 | Nilssen |
| 5,216,704 A | 6/1993 | Williams et al. |
| 5,220,597 A | 6/1993 | Horiuchi |
| 5,224,154 A | 6/1993 | Aldridge et al. |
| 5,247,347 A | 9/1993 | Litteral et al. |
| 5,257,006 A | 10/1993 | Graham et al. |
| 5,265,154 A | 11/1993 | Schotz |
| 5,274,631 A | 12/1993 | Bhardwaj |
| 5,283,637 A | 2/1994 | Goolcharan |
| 5,283,825 A | 2/1994 | Druckman et al. |
| 5,289,359 A | 2/1994 | Ziermann |
| 5,323,461 A | 6/1994 | Rosenbaum et al. |
| 5,341,415 A | 8/1994 | Baran |
| 5,343,514 A | 8/1994 | Snyder |
| 5,345,437 A | 9/1994 | Ogawa |
| 5,347,549 A | 9/1994 | Baumann |
| 5,351,272 A | 9/1994 | Abraham |
| 5,353,334 A | 10/1994 | O'Sullivan |
| 5,363,432 A | 11/1994 | Martin et al. |
| 5,379,005 A | 1/1995 | Aden et al. |
| 5,381,462 A | 1/1995 | Larson et al. |
| 5,391,932 A | 2/1995 | Small et al. |
| 5,408,260 A | 4/1995 | Arnon |
| 5,410,343 A | 4/1995 | Coddington et al. |
| 5,420,578 A | 5/1995 | O'Brien et al. |
| 5,420,886 A | 5/1995 | Ohmori |
| 5,424,710 A | 6/1995 | Baumann |
| 5,425,089 A | 6/1995 | Chan et al. |
| 5,428,608 A | 6/1995 | Freeman et al. |
| 5,428,682 A | 6/1995 | Apfel |
| 5,452,289 A | 9/1995 | Sharma et al. |
| 5,454,008 A | 9/1995 | Baumann et al. |
| 5,461,671 A | 10/1995 | Sakuragi et al. |
| 5,463,616 A | 10/1995 | Kruse et al. |
| 5,475,687 A | 12/1995 | Markkula, Jr. et al. |
| 5,479,447 A | 12/1995 | Chow et al. |
| 5,483,574 A | 1/1996 | Yuyama |
| 5,513,251 A | 4/1996 | Rochkind et al. |
| 5,519,731 A | 5/1996 | Cioffi |
| 5,530,748 A | 6/1996 | Ohmori |
| 5,534,912 A | 7/1996 | Kostreski |
| 5,539,805 A | 7/1996 | Bushue et al. |
| 5,544,243 A | 8/1996 | Papadoppoulos |
| 5,546,385 A | 8/1996 | Caspi et al. |
| 5,548,592 A | 8/1996 | Komarek et al. |
| 5,548,614 A | 8/1996 | Stoll et al. |
| 5,550,836 A | 8/1996 | Albrecht et al. |
| 5,550,900 A | 8/1996 | Ensor et al. |
| 5,553,063 A | 9/1996 | Dickson |
| 5,553,138 A | 9/1996 | Heald et al. |
| 5,557,612 A | 9/1996 | Bingham |
| 5,568,547 A | 10/1996 | Nishimura |
| 5,570,085 A | 10/1996 | Bertsch |
| 5,574,748 A | 11/1996 | Vander Mey et al. |
| 5,583,934 A | 12/1996 | Zhou |
| 5,587,692 A | 12/1996 | Graham et al. |
| 5,594,789 A | 1/1997 | Seazholtz et al. |
| 5,608,447 A | 3/1997 | Farry et al. |
| 5,608,725 A | 3/1997 | Grube et al. |
| 5,608,792 A | 3/1997 | Laidler |
| 5,610,916 A | 3/1997 | Kostreski et al. |
| 5,613,190 A | 3/1997 | Hylton |
| 5,613,191 A | 3/1997 | Hylton et al. |
| 5,619,505 A | 4/1997 | Grube et al. |
| 5,621,455 A | 4/1997 | Rogers et al. |
| 5,623,537 A | 4/1997 | Ensor et al. |
| 5,625,651 A | 4/1997 | Cioffi |
| 5,625,677 A | 4/1997 | Feiertag et al. |
| 5,625,863 A | 4/1997 | Abraham |
| 5,627,501 A | 5/1997 | Biran et al. |
| 5,646,983 A | 7/1997 | Suffern et al. |
| 5,651,696 A | 7/1997 | Jennison |
| 5,659,608 A | 8/1997 | Stiefel |
| 5,668,814 A | 9/1997 | Balatoni |
| 5,668,857 A | 9/1997 | McHale |
| 5,673,290 A | 9/1997 | Cioffi |
| 5,675,375 A | 10/1997 | Riffee |
| 5,682,423 A | 10/1997 | Walker |
| 5,684,826 A | 11/1997 | Ratner |
| 5,696,790 A | 12/1997 | Graham et al. |
| 5,699,413 A | 12/1997 | Sridhar |
| 5,706,007 A | 1/1998 | Fragnito et al. |
| 5,706,157 A | 1/1998 | Galecki et al. |
| 5,708,701 A | 1/1998 | Houvig et al. |
| 5,712,977 A | 1/1998 | Glad et al. |
| 5,742,527 A | 4/1998 | Rybicki et al. |
| 5,748,634 A | 5/1998 | Sokol et al. |
| 5,751,701 A | 5/1998 | Langberg et al. |
| 5,754,539 A | 5/1998 | Metz et al. |
| 5,756,280 A | 5/1998 | Soora et al. |
| 5,757,803 A | 5/1998 | Russell et al. |
| 5,768,279 A | 6/1998 | Barn et al. |
| 5,771,236 A | 6/1998 | Sansom et al. |
| 5,777,769 A | 7/1998 | Coutinho |
| 5,778,303 A | 7/1998 | Shinozaki et al. |
| 5,781,617 A | 7/1998 | McHale et al. |
| 5,787,115 A | 7/1998 | Turnbull et al. |
| 5,790,548 A | 8/1998 | Sistanizadeh et al. |
| 5,793,413 A | 8/1998 | Hylton et al. |
| 5,799,069 A | 8/1998 | Weston et al. |
| 5,802,283 A | 9/1998 | Grady et al. |
| 5,805,053 A | 9/1998 | Patel et al. |
| 5,809,033 A | 9/1998 | Turner et al. |
| 5,812,786 A | 9/1998 | Seazholtz et al. |
| 5,815,681 A | 9/1998 | Kikinis |
| 5,818,710 A | 10/1998 | LeVan Suu |
| 5,818,821 A | 10/1998 | Schurig |
| 5,822,374 A | 10/1998 | Levin |
| 5,828,821 A | 10/1998 | Hoshina et al. |
| 5,832,057 A | 11/1998 | Furman |
| 5,835,005 A | 11/1998 | Furukawa et al. |
| 5,841,360 A | 11/1998 | Binder |
| 5,841,840 A | 11/1998 | Smith et al. |
| 5,841,841 A | 11/1998 | Dodds et al. |
| 5,842,032 A | 11/1998 | Bertsch |
| 5,844,888 A | 12/1998 | Markkula et al. |
| 5,848,150 A | 12/1998 | Bingel |
| 5,878,047 A | 3/1999 | Ganek et al. |
| 5,878,133 A | 3/1999 | Zhou et al. |
| 5,886,732 A | 3/1999 | Humpleman |
| 5,889,856 A | 3/1999 | O'Toole et al. |
| 5,892,792 A | 4/1999 | Walley |
| 5,896,443 A | 4/1999 | Dichter |
| 5,898,761 A | 4/1999 | McHale et al. |
| 5,903,213 A | 5/1999 | Hodge et al. |
| 5,905,781 A | 5/1999 | McHale et al. |
| 5,905,786 A | 5/1999 | Hoopes |
| 5,910,970 A | 6/1999 | Lu |
| 5,912,895 A | 6/1999 | Terry et al. |
| 5,917,814 A | 6/1999 | Balatoni |
| 5,930,340 A | 7/1999 | Bell |
| 5,936,963 A | 8/1999 | Saussy |
| 5,938,757 A | 8/1999 | Bertsch |
| 5,940,400 A | 8/1999 | Eastmond et al. |
| 5,940,738 A | 8/1999 | Rao |
| 5,949,476 A | 9/1999 | Pocock et al. |
| 5,956,323 A | 9/1999 | Bowie |
| 5,960,066 A | 9/1999 | Hartmann et al. |
| 5,963,539 A | 10/1999 | Webber, Jr. et al. |

| | | |
|---|---|---|
| 5,963,595 A | 10/1999 | Graham et al. |
| 5,982,784 A | 11/1999 | Bell |
| 5,987,061 A | 11/1999 | Chen |
| 5,991,311 A | 11/1999 | Long et al. |
| 5,994,998 A | 11/1999 | Fisher et al. |
| 5,995,598 A | 11/1999 | Berstis |
| 5,999,518 A | 12/1999 | Nattkemper et al. |
| 6,002,682 A | 12/1999 | Bellenger et al. |
| 6,002,722 A | 12/1999 | Wu |
| 6,005,873 A | 12/1999 | Amit |
| 6,011,781 A | 1/2000 | Bell |
| 6,011,910 A | 1/2000 | Chau et al. |
| 6,014,386 A | 1/2000 | Abraham |
| 6,014,431 A | 1/2000 | McHale et al. |
| 6,021,158 A | 2/2000 | Schurr et al. |
| 6,026,150 A | 2/2000 | Frank |
| 6,026,160 A | 2/2000 | Staber et al. |
| 6,028,867 A | 2/2000 | Rawson et al. |
| 6,038,300 A | 3/2000 | Hartmann et al. |
| 6,038,425 A | 3/2000 | Jeffrey |
| 6,049,531 A | 4/2000 | Roy |
| 6,052,380 A | 4/2000 | Bell |
| 6,055,268 A | 4/2000 | Timm et al. |
| 6,061,357 A | 5/2000 | Olshansky et al. |
| 6,061,392 A | 5/2000 | Bremer et al. |
| 6,064,422 A | 5/2000 | Goolcharan et al. |
| 6,069,879 A | 5/2000 | Chatter |
| 6,069,899 A | 5/2000 | Foley |
| 6,072,779 A | 6/2000 | Tzannes et al. |
| 6,072,810 A | 6/2000 | Van der Putten et al. |
| 6,075,784 A | 6/2000 | Frankel et al. |
| 6,081,519 A | 6/2000 | Petler |
| 6,087,860 A | 7/2000 | Liu et al. |
| 6,088,368 A | 7/2000 | Rubinstain et al. |
| 6,094,441 A | 7/2000 | Jung et al. |
| 6,107,912 A | 8/2000 | Bullock et al. |
| 6,108,330 A | 8/2000 | Bhatia et al. |
| 6,111,595 A | 8/2000 | Hertrich |
| 6,111,764 A | 8/2000 | Atou et al. |
| 6,111,936 A | 8/2000 | Bremer |
| 6,114,970 A | 9/2000 | Kirson et al. |
| 6,115,468 A | 9/2000 | De Nicolo |
| 6,115,755 A | 9/2000 | Krishan |
| 6,130,879 A | 10/2000 | Liu |
| 6,130,893 A | 10/2000 | Whittaker et al. |
| 6,130,896 A | 10/2000 | Lueker et al. |
| 6,137,865 A | 10/2000 | Ripy et al. |
| 6,137,866 A | 10/2000 | Staber et al. |
| 6,141,330 A | 10/2000 | Akers |
| 6,141,339 A | 10/2000 | Kaplan et al. |
| 6,141,356 A | 10/2000 | Gorman |
| 6,148,006 A | 11/2000 | Dyke et al. |
| 6,151,480 A | 11/2000 | Fischer et al. |
| 6,157,716 A | 12/2000 | Ortel |
| 6,167,043 A | 12/2000 | Frantz |
| 6,175,860 B1 | 1/2001 | Gaucher |
| 6,178,080 B1 | 1/2001 | Wilken et al. |
| 6,178,161 B1 | 1/2001 | Terry |
| 6,181,775 B1 | 1/2001 | Bella |
| 6,186,826 B1 | 2/2001 | Weikle |
| 6,192,399 B1 | 2/2001 | Goodman |
| 6,195,706 B1 | 2/2001 | Scott |
| 6,202,211 B1 | 3/2001 | Williams, Jr. |
| 6,205,202 B1 | 3/2001 | Yoshida et al. |
| 6,208,637 B1 | 3/2001 | Eames |
| 6,212,204 B1 | 4/2001 | Depue |
| 6,212,227 B1 | 4/2001 | Ko et al. |
| 6,212,274 B1 | 4/2001 | Ninh |
| 6,215,789 B1 | 4/2001 | Keenan et al. |
| 6,215,855 B1 | 4/2001 | Schneider |
| 6,216,160 B1 | 4/2001 | Dichter |
| 6,227,499 B1 | 5/2001 | Jennison et al. |
| 6,229,818 B1 | 5/2001 | Bell |
| 6,236,664 B1 | 5/2001 | Erreygers |
| 6,239,672 B1 | 5/2001 | Lutz, Jr. et al. |
| 6,240,091 B1 | 5/2001 | Ginzboorg et al. |
| 6,240,166 B1 | 5/2001 | Collin et al. |
| 6,243,394 B1 | 6/2001 | Deng |
| 6,246,695 B1 | 6/2001 | Seazholtz et al. |
| 6,246,716 B1 | 6/2001 | Schneider |
| 6,246,748 B1 | 6/2001 | Yano |
| 6,252,755 B1 | 6/2001 | Willer |
| 6,252,957 B1 | 6/2001 | Jauregui et al. |
| 6,256,518 B1 | 7/2001 | Buhrmann |
| 6,259,676 B1 | 7/2001 | Kellock et al. |
| 6,266,348 B1 | 7/2001 | Gross et al. |
| 6,272,219 B1 | 8/2001 | De Bruycker et al. |
| 6,278,769 B1 | 8/2001 | Bella |
| 6,286,049 B1 | 9/2001 | Rajakarunanayake et al. |
| 6,288,334 B1 | 9/2001 | Hennum |
| 6,292,467 B1 | 9/2001 | Keller |
| 6,292,517 B1 | 9/2001 | Jeffress et al. |
| 6,295,356 B1 | 9/2001 | De Nicolo |
| 6,298,037 B1 | 10/2001 | Sharifi |
| 6,301,337 B1 | 10/2001 | Scholtz et al. |
| 6,310,894 B1 | 10/2001 | Counterman |
| 6,310,909 B1 | 10/2001 | Jones |
| 6,314,102 B1 | 11/2001 | Czerwiec et al. |
| 6,317,884 B1 | 11/2001 | Eames et al. |
| 6,320,866 B2 | 11/2001 | Wolf et al. |
| 6,320,900 B1 | 11/2001 | Liu |
| 6,324,268 B1 | 11/2001 | Balachandran et al. |
| 6,329,937 B1 | 12/2001 | Harman |
| 6,346,964 B1 | 2/2002 | Rogers et al. |
| 6,349,133 B1 | 2/2002 | Matthews et al. |
| 6,353,629 B1 | 3/2002 | Pal |
| 6,359,906 B1 | 3/2002 | Dyke et al. |
| 6,370,149 B1 | 4/2002 | Gorman et al. |
| 6,385,203 B2 | 5/2002 | McHale et al. |
| 6,388,990 B1 | 5/2002 | Wetzel |
| 6,389,110 B1 | 5/2002 | Fischer et al. |
| 6,389,125 B1 | 5/2002 | Ubowski |
| 6,393,050 B1 | 5/2002 | Liu |
| 6,396,391 B1 | 5/2002 | Binder |
| 6,396,837 B1 | 5/2002 | Wang et al. |
| 6,404,861 B1 | 6/2002 | Cohen et al. |
| 6,414,952 B2 | 7/2002 | Foley |
| 6,424,661 B1 | 7/2002 | Bentley |
| 6,427,237 B1 | 7/2002 | Aranguren et al. |
| 6,430,199 B1 | 8/2002 | Kerpez |
| 6,433,672 B1 | 8/2002 | Shirmard |
| 6,434,123 B1 | 8/2002 | Park |
| 6,438,109 B1 | 8/2002 | Karaoguz et al. |
| 6,442,195 B1 | 8/2002 | Liu et al. |
| 6,445,087 B1 | 9/2002 | Wang et al. |
| 6,449,318 B1 | 9/2002 | Rumbaugh |
| 6,449,348 B1 | 9/2002 | Lamb et al. |
| 6,452,923 B1 | 9/2002 | Gerszberg et al. |
| 6,456,714 B2 | 9/2002 | Shima et al. |
| 6,470,053 B1 | 10/2002 | Liu |
| 6,473,495 B1 | 10/2002 | Willer |
| 6,477,595 B1 | 11/2002 | Cohen et al. |
| 6,480,122 B1 | 11/2002 | Oddy et al. |
| 6,480,510 B1 | 11/2002 | Binder |
| 6,483,902 B1 | 11/2002 | Stewart et al. |
| 6,483,903 B1 | 11/2002 | Itay et al. |
| 6,490,273 B1 | 12/2002 | DeNap et al. |
| 6,493,875 B1 | 12/2002 | Eames et al. |
| 6,507,297 B2 | 1/2003 | Perez |
| 6,510,204 B2 | 1/2003 | De Clercq et al. |
| 6,519,291 B1 | 2/2003 | Dagdeviren et al. |
| 6,522,352 B1 | 2/2003 | Strandwitz et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,110 B1 | 3/2003 | Arora et al. |
| 6,535,580 B1 | 3/2003 | Strauss et al. |
| 6,535,587 B1 | 3/2003 | Kobayashi |
| 6,539,011 B1 | 3/2003 | Keenan et al. |
| 6,542,465 B1 | 4/2003 | Wang |
| 6,546,024 B1 | 4/2003 | Sharper et al. |
| 6,546,098 B1 | 4/2003 | Henderson |
| 6,549,616 B1 | 4/2003 | Binder |
| 6,556,581 B1 | 4/2003 | He et al. |

| | | |
|---|---|---|
| 6,560,319 B1 | 5/2003 | Binder |
| 6,560,333 B1 | 5/2003 | Consiglio et al. |
| 6,563,816 B1 | 5/2003 | Nodoushani et al. |
| 6,567,981 B1 | 5/2003 | Jeffrey |
| 6,570,890 B1 | 5/2003 | Keenan et al. |
| 6,572,384 B1 | 6/2003 | Marchevsky |
| 6,574,237 B1 | 6/2003 | Bullman et al. |
| 6,574,242 B1 | 6/2003 | Keenan et al. |
| 6,574,313 B1 | 6/2003 | Chea, Jr. et al. |
| 6,577,631 B1 | 6/2003 | Keenan et al. |
| 6,577,882 B1 | 6/2003 | Roos |
| 6,580,254 B2 | 6/2003 | Schofield |
| 6,580,710 B1 | 6/2003 | Bowen et al. |
| 6,580,727 B1 | 6/2003 | Yim et al. |
| 6,580,785 B2 | 6/2003 | Bremer et al. |
| 6,584,122 B1 | 6/2003 | Matthews et al. |
| 6,584,148 B1 | 6/2003 | Zitting et al. |
| 6,584,197 B1 | 6/2003 | Boudreaux, Jr. et al. |
| 6,587,454 B1 | 7/2003 | Lamb |
| 6,587,473 B2 | 7/2003 | Terry et al. |
| 6,587,479 B1 | 7/2003 | Bianchi et al. |
| 6,587,560 B1 | 7/2003 | Scott et al. |
| 6,597,732 B1 | 7/2003 | Dowling |
| 6,603,808 B1 | 8/2003 | Anne et al. |
| 6,611,537 B1 | 8/2003 | Edens et al. |
| 6,636,505 B1 | 10/2003 | Wang et al. |
| 6,639,913 B1 | 10/2003 | Frankel et al. |
| 6,648,308 B2 | 11/2003 | Gunnar Rothoff |
| 6,653,932 B1 | 11/2003 | Beamish et al. |
| 6,658,098 B2 | 12/2003 | Lamb et al. |
| 6,658,108 B1 * | 12/2003 | Bissell et al. ................ 379/413 |
| 6,665,404 B2 | 12/2003 | Cohen |
| 6,674,843 B1 | 1/2004 | Ham |
| 6,674,845 B2 | 1/2004 | Ayoub et al. |
| 6,678,321 B1 | 1/2004 | Graham et al. |
| 6,678,721 B1 | 1/2004 | Bell |
| 6,680,940 B1 | 1/2004 | Lewin et al. |
| 6,681,013 B1 | 1/2004 | Miyamoto |
| 6,690,677 B1 | 2/2004 | Binder |
| 6,690,792 B1 | 2/2004 | Robinson et al. |
| 6,693,916 B1 | 2/2004 | Chaplik et al. |
| 6,697,358 B2 | 2/2004 | Bernstein |
| 6,700,970 B1 | 3/2004 | Aronson et al. |
| 6,701,406 B1 | 3/2004 | Chang et al. |
| 6,710,704 B2 | 3/2004 | Fisher et al. |
| 6,711,138 B1 | 3/2004 | Pai et al. |
| 6,711,260 B1 | 3/2004 | Russell et al. |
| 6,714,534 B1 | 3/2004 | Gerszberg et al. |
| 6,721,365 B1 | 4/2004 | Yin et al. |
| 6,721,419 B1 | 4/2004 | Stell et al. |
| 6,721,790 B1 | 4/2004 | Chen |
| 6,724,750 B1 | 4/2004 | Sun |
| 6,725,059 B1 | 4/2004 | Bell |
| 6,731,627 B1 | 5/2004 | Gupta et al. |
| 6,732,315 B2 | 5/2004 | Yagil et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,744,883 B1 | 6/2004 | Bingel et al. |
| 6,747,995 B1 | 6/2004 | Brown et al. |
| 6,747,996 B2 | 6/2004 | Holloway et al. |
| 6,748,078 B1 | 6/2004 | Posthuma |
| 6,754,186 B1 | 6/2004 | Bullman |
| 6,754,235 B2 | 6/2004 | Van Der Putten et al. |
| 6,757,382 B1 | 6/2004 | Wilkes, Jr. et al. |
| 6,760,384 B1 | 7/2004 | Garreau et al. |
| 6,763,097 B1 | 7/2004 | Vitenberg |
| 6,763,109 B1 | 7/2004 | Hoskins |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,775,299 B1 | 8/2004 | Olson et al. |
| 6,778,549 B1 | 8/2004 | Keller |
| 6,778,646 B1 | 8/2004 | Sun |
| 6,785,296 B1 | 8/2004 | Bell |
| 6,792,323 B2 | 9/2004 | Krzyzanowski et al. |
| 6,795,539 B2 | 9/2004 | Culli et al. |
| 6,813,343 B1 | 11/2004 | Vitenberg |
| 6,815,844 B1 | 11/2004 | Kovarik |
| 6,816,512 B2 | 11/2004 | Lazarus et al. |
| 6,819,760 B1 | 11/2004 | Nayler |
| 6,826,174 B1 | 11/2004 | Erekson et al. |
| 6,831,975 B1 | 12/2004 | Easwaran et al. |
| 6,831,976 B1 | 12/2004 | Comerford et al. |
| 6,836,546 B1 | 12/2004 | Willer |
| 6,839,345 B2 | 1/2005 | Lu et al. |
| 6,842,426 B2 | 1/2005 | Bogardus et al. |
| 6,842,459 B1 | 1/2005 | Binder |
| 6,847,718 B1 | 1/2005 | Hiraoka |
| 6,853,724 B2 | 2/2005 | Wang |
| 6,856,799 B1 | 2/2005 | Ritter |
| 6,862,353 B2 | 3/2005 | Rabenko et al. |
| 6,865,193 B2 | 3/2005 | Terk |
| 6,868,072 B1 | 3/2005 | Lin et al. |
| 6,868,117 B1 | 3/2005 | Mardinian |
| 6,886,181 B1 | 4/2005 | Dodds et al. |
| 6,891,881 B2 | 5/2005 | Trachewsky et al. |
| 6,895,089 B2 | 5/2005 | Wang |
| 6,898,413 B2 | 5/2005 | Yip et al. |
| 6,904,134 B2 | 6/2005 | Jeon et al. |
| 6,904,149 B2 | 6/2005 | Keenum et al. |
| 6,909,725 B1 | 6/2005 | Chow |
| 6,917,681 B2 | 7/2005 | Robinson et al. |
| 6,922,407 B2 | 7/2005 | Wu |
| 6,925,089 B2 | 8/2005 | Chow et al. |
| 6,927,340 B1 | 8/2005 | Binder |
| 6,934,754 B2 | 8/2005 | West et al. |
| 6,937,056 B2 | 8/2005 | Binder |
| 6,940,918 B1 | 9/2005 | Nayler et al. |
| 6,941,364 B2 | 9/2005 | Kim et al. |
| 6,947,736 B2 | 9/2005 | Shaver et al. |
| 6,956,826 B1 | 10/2005 | Binder |
| 6,961,303 B1 | 11/2005 | Binder |
| 6,963,559 B2 | 11/2005 | Elo |
| 6,973,394 B2 | 12/2005 | Jaeger et al. |
| 6,975,713 B1 | 12/2005 | Smith et al. |
| 6,980,638 B1 | 12/2005 | Smith et al. |
| 6,989,733 B2 | 1/2006 | Simonsen et al. |
| 6,996,134 B1 | 2/2006 | Renucci et al. |
| 6,996,213 B1 | 2/2006 | De Jong |
| 6,996,729 B2 | 2/2006 | Volkening et al. |
| 6,998,964 B2 | 2/2006 | Lomax, Jr. et al. |
| 6,999,433 B2 | 2/2006 | Baum |
| 7,003,102 B2 * | 2/2006 | Kiko ........................... 379/413 |
| 7,006,445 B1 | 2/2006 | Cole et al. |
| 7,009,946 B1 | 3/2006 | Kardach |
| 7,012,922 B1 | 3/2006 | Unitt et al. |
| 7,016,377 B1 | 3/2006 | Chun et al. |
| 7,031,394 B2 | 4/2006 | Vitenberg |
| 7,035,270 B2 | 4/2006 | Moore, Jr. et al. |
| 7,046,796 B2 * | 5/2006 | Rabenko et al. ............. 379/413 |
| 7,050,546 B1 | 5/2006 | Richardson et al. |
| 7,053,501 B1 | 5/2006 | Barrass |
| 7,054,303 B2 | 5/2006 | Miyazaki et al. |
| 7,054,442 B2 | 5/2006 | Weikle |
| 7,058,174 B2 | 6/2006 | Posthuma |
| 7,068,649 B2 | 6/2006 | Fisher et al. |
| 7,068,682 B2 | 6/2006 | Campbell et al. |
| 7,079,647 B2 | 7/2006 | Tomobe |
| 7,085,238 B2 | 8/2006 | McBeath |
| 7,088,238 B2 | 8/2006 | Karaoguz et al. |
| 7,095,848 B1 | 8/2006 | Fischer et al. |
| 7,095,849 B2 | 8/2006 | Smith et al. |
| 7,099,368 B2 | 8/2006 | Santhoff et al. |
| 7,099,707 B2 | 8/2006 | Amin et al. |
| 7,106,721 B1 | 9/2006 | Binder |
| 7,113,574 B1 | 9/2006 | Haas et al. |
| 7,116,685 B2 | 10/2006 | Brown et al. |
| 7,133,423 B1 | 11/2006 | Chow et al. |
| 7,142,560 B2 | 11/2006 | Mansfield |
| 7,142,563 B1 | 11/2006 | Lin |
| 7,145,996 B2 | 12/2006 | Creamer et al. |
| 7,149,182 B1 | 12/2006 | Renucci et al. |
| 7,149,474 B1 | 12/2006 | Mikhak |
| 7,154,996 B2 | 12/2006 | Strauss |
| 7,167,923 B2 | 1/2007 | Lo |

| | | |
|---|---|---|
| 7,174,007 B1 | 2/2007 | Cannon |
| 7,190,716 B2 | 3/2007 | Norrell et al. |
| 7,194,639 B2 | 3/2007 | Atkinson et al. |
| 7,209,945 B2 | 4/2007 | Hicks, III et al. |
| 7,215,763 B1 | 5/2007 | Keller et al. |
| 7,239,627 B2 | 7/2007 | Nattkemper et al. |
| 7,239,628 B1 | 7/2007 | Pendleton et al. |
| 7,256,704 B2 | 8/2007 | Yoon et al. |
| 7,257,106 B2 | 8/2007 | Chen et al. |
| 7,263,362 B1 | 8/2007 | Young et al. |
| 7,274,669 B2 | 9/2007 | Czerwiec et al. |
| 7,283,554 B2 | 10/2007 | Ophir et al. |
| 7,292,859 B2 | 11/2007 | Park |
| 7,293,103 B1 | 11/2007 | Lin et al. |
| 7,301,940 B1 | 11/2007 | Bernstein |
| 7,305,006 B1 | 12/2007 | Bella |
| 7,308,086 B2 | 12/2007 | Yoshitani |
| 7,327,765 B1 | 2/2008 | Ojard |
| 7,340,051 B2 | 3/2008 | Phillips et al. |
| 7,346,071 B2 | 3/2008 | Bareis |
| 7,382,786 B2 | 6/2008 | Chen et al. |
| 7,408,949 B2 | 8/2008 | Baum |
| 2001/0047418 A1 | 11/2001 | White |
| 2002/0003873 A1 | 1/2002 | Rabenko et al. |
| 2002/0006137 A1 | 1/2002 | Rabenko et al. |
| 2002/0015489 A1* | 2/2002 | Ben-David .................... 379/413 |
| 2002/0035624 A1 | 3/2002 | Kim |
| 2002/0057581 A1 | 5/2002 | Nadav |
| 2002/0076038 A1 | 6/2002 | Barrese et al. |
| 2002/0110236 A1 | 8/2002 | Karnad |
| 2002/0114325 A1 | 8/2002 | Dale et al. |
| 2002/0118818 A1 | 8/2002 | Miller et al. |
| 2002/0128009 A1 | 9/2002 | Boch et al. |
| 2002/0144159 A1 | 10/2002 | Wu et al. |
| 2002/0150100 A1 | 10/2002 | White et al. |
| 2002/0154629 A1 | 10/2002 | Lohman et al. |
| 2002/0176567 A1 | 11/2002 | Chen et al. |
| 2002/0198952 A1 | 12/2002 | Bell |
| 2003/0012365 A1* | 1/2003 | Goodman ................ 379/413.02 |
| 2003/0016794 A1 | 1/2003 | Brothers |
| 2003/0048895 A1 | 3/2003 | Kiko et al. |
| 2003/0151695 A1 | 8/2003 | Sahlin et al. |
| 2003/0198246 A1 | 10/2003 | Lifshitz et al. |
| 2003/0198341 A1 | 10/2003 | Smith et al. |
| 2003/0206623 A1 | 11/2003 | Deichstetter et al. |
| 2004/0083262 A1 | 4/2004 | Trantow |
| 2004/0087214 A1 | 5/2004 | Cho |
| 2004/0090984 A1 | 5/2004 | Saint-Hilaire et al. |
| 2004/0107299 A1 | 6/2004 | Lee et al. |
| 2004/0125819 A1 | 7/2004 | Binder |
| 2004/0172658 A1 | 9/2004 | Rakib et al. |
| 2004/0204040 A1 | 10/2004 | Heijnen |
| 2004/0208167 A1 | 10/2004 | Kishida |
| 2004/0250273 A1 | 12/2004 | Swix et al. |
| 2004/0268160 A1 | 12/2004 | Atkinson et al. |
| 2005/0038875 A1 | 2/2005 | Park |
| 2005/0047431 A1 | 3/2005 | Binder |
| 2005/0078700 A1 | 4/2005 | Thompson et al. |
| 2005/0086694 A1 | 4/2005 | Hicks et al. |
| 2005/0114325 A1 | 5/2005 | Liu et al. |
| 2005/0150100 A1 | 7/2005 | Merdan et al. |
| 2005/0220021 A1 | 10/2005 | Sosnowski et al. |
| 2006/0029210 A1 | 2/2006 | Feugere |
| 2006/0034449 A1 | 2/2006 | Joerger |
| 2006/0067521 A1 | 3/2006 | Muise et al. |
| 2006/0092961 A1 | 5/2006 | Sclater et al. |
| 2006/0153169 A1 | 7/2006 | Koifman et al. |
| 2006/0193310 A1 | 8/2006 | Landry et al. |
| 2006/0193313 A1 | 8/2006 | Landry et al. |
| 2006/0215680 A1 | 9/2006 | Camagna |
| 2006/0238250 A1 | 10/2006 | Camagna et al. |
| 2006/0251094 A1 | 11/2006 | Van Vleck et al. |
| 2006/0251159 A1 | 11/2006 | Huotari et al. |
| 2006/0251179 A1 | 11/2006 | Ghoshal |
| 2006/0280197 A1 | 12/2006 | Stone |
| 2006/0291493 A1 | 12/2006 | Schley-May et al. |

FOREIGN PATENT DOCUMENTS

| | | |
|---|---|---|
| EP | 0863654 A2 | 9/1998 |
| EP | 1 009 156 A2 | 6/2000 |
| JP | 04137847 | 5/1992 |
| JP | 05093146 U | 12/1993 |
| JP | 10-257208 | 9/1998 |
| JP | 10-285299 | 10/1998 |
| JP | 3-277143 | 12/2001 |
| WO | 9623377 A1 | 8/1996 |
| WO | WO 99/12330 A1 | 3/1999 |
| WO | WO 01/71980 A1 | 9/2001 |
| WO | WO 01/80543 A2 | 10/2001 |
| WO | WO 01/80543 A3 | 10/2001 |

OTHER PUBLICATIONS

Grayson Evans, The CEBUs Standard User's Guide, 1st edition, May 1996, 317 pages.

IS-60.04; Node Communications Protocol Part 6: Application Layer Specification; Revision Apr. 18, 1996 (129 pages).

O. Agazzi, et al., "Large Scale Integration of Hybrid-Method Digital Subscriber Loops, "IEEE Transactions on Communications, vol. COM-30, No. 9, Sep. 1982, pp. 2095-2108.

S.V. Ahamed, et al., "A tutorial on Two-Wire Digital Transmission in the Loop Plant", IEEE Transactions on Communications, vol. COM-29, No. 11, Nov. 1991, pp. 1554-1564.

S.B. Andrews, "The Generic Digital Channel Concept", IEEE International Conference on Communications, 1985, Jun. 23-26, 1985, Chicago, IL, pp. 7.1.1-7.1.3.

G.W. Beene, "Design Considerations for a CO-Powered Distributed-Drop PCM Station Carrier", IEEE Transactions on Communications, vol. COM-30, No. 9, Sep. 1982, pp. 2022-2028.

A. Bienz, "1+1=1—Order Das Telefonnetz Als Datennetz", Sysdata, vol. 16, Aug. 28, 1985, pp. 41-42.

A. Brosio, et al., "A Comparison of Digital Subscriber Line Transmission Systems Employing Different Line Codes", IEEE Transactions on Communications, vol. COM-29, No. 11, Nov. 1981, pp. 1581-1588.

T.P. Byrne, et al., "Positioning the Subscriber Loop Network for Digital Services", IEEE Transactions on Communications, vol. COM-30, No. 9, Sep. 1982, pp. 2006-2011.

R.G. Cornell, et al., "Progress Towards Digital Subscriber Line Services and Signaling", IEEE Transactions on Communications, vol. COM-29, No. 11, Nov. 1981, pp. 1589-1594.

S. Davis, "Integrating Voice and Data: A Marriage of Convenience", Today's Office, vol. 24, No. 9, Feb. 1990, pp. 28-30.

H. Fuchs, et al., "Providing Full Duplex Transmission Over Two-Wire Subscriber Loops", Telephony, vol. 208, No. 11, Mar. 18, 1985, pp. 76, 77, 78 and 84.

H. Fukagawa, et al., "Bus Wiring System for Residences", Matsushita Electric Works Technical Report, No. 36, Feb. 1988, pp. 31-35.

D. Glick, et al., "Providing Telco Customers Continuous Data Services", Telephony, vol. 205, No. 22, Nov. 1983, pp. 46, 50, 51, 54.

J.B. Hughes, et al., "A Receiver IC for a 1+1 Digital Subscriber Loop", IEEE Journal of Solid State Circuitry, vol. S.C. 20, No. 3, Jun. 1985 pp. 671-678.

R. Jelski, "Subscriber Subcarrier System—A New Life," Communications International, vol. 4, No. 5, May 1977, pp. 29-30.

A.J. Karia, et al., "A Digital Subscriber Carrier System for the Evolving Subscriber Loop Network", IEEE Transactions on Communications, vol. COM-30, No. 9, Sep. 1982, pp. 2012, 2014, 2015.

T. Masuda, et al., "2-Wire Video Intercom System with Telephone", National Technical Report, vol. 37, No. 6, Dec. 1991, pp. 74-80.

T. Matthews, "Telecomm System is Nerve Center", Infosystems, vol. 31, No. 5, May 1984, pp. 68-69.

J. K. Merrow, "A New Approach to Integrating Local Area Data and Voice Transmission," Telephony, vol. 250, No. 17, Oct. 1983, 2 pages.

H. Morgan, "Two-Wire Full-Duplex Modem Simplifies Voice and Data Networking", Mini-Micro Systems, vol. 17, No. 3, Mar. 1984, 4 pages.

R. Murakoshi, "Home Automation", Journal of the Society of Instrument and Control Engineers, vol. 23, No. 11, Nov. 1984, pp. 955-958.

R.D. Nash, et al., "Simultaneous Transmission of Speech and Data Over An Analog Telephone Channel", GLOBECOM '85. IEEE Global Telecommunications Conference. Conference Record. Communication Technology to Provide New Services, Dec. 25, 1985, New Orleans, Louisiana, pp. 4.2.1-4.2.4.

H. Ogiwara, et al., Design Philosophy and Hardware Implementation for Digital Subscriber Loops, IEEE Transactions on Communications, vol. COM-30, No. 9, Sep. 1982, pp. 2057-2065.

J.L. Pernin, "Related Evolution of Subscriber Loop Plant and Residential Data Transmission Needs", Intelcon 79 Exposition Proceedings, Feb. 26-Mar. 2, 1979, Dallas, Texas, pp. 596-599.

R.A. Tatum, "Project Victoria—the 7-in-1 Solution", Telephone Engineer and Management, vol. 90, No. 1, Jan. 1, 1986, pp. 47 and 50.

A. Teshima, et al., "Still Video Telecommunication Over the Analog Telephone Network", Journal of the Institute of Television Engineers of Japan, vol. 42, No. 11, Nov. 1988, pp. 1162-1167.

S.R. Treves, et al., "Text, Image and Data Integration in a Distributed Control Digital Voice Switching System", International Switching Symposium—ISS 81 CIC, Sep. 21-25, 1981, Montreal, Quebec, Canada, pp. 1-7.

T. Tsuda, et al., "Experimental In-House Multiservice Communication System", Fujitsu Scientific and Technical Journal, vol. 16, No. 3, Sep. 1980, pp. 29-45.

K. Urui, "Integrated Voice/Data Digital EPBX", Toshiba Review, No. 150, Winter 1984, pp. 30-33.

A.F. Van Den Berg, et al., "Principles van de Modem: Technieken en Specificaties", Elektronica, vol. 32, No. 5, Mar. 9, 1984, pp. 11, 13, 15, 17, 19 and 21.

M.G. Vry, et al., "Digital 1+1 Systems for Local Network Enhancement", Conference on Communications Equipment and Systems, Apr. 20-22, 1982, Birmingham, United Kingdom, pp. 61-64.

J.A. Webb, "A New Concept in Data-Above-Voice (DAV)", PTC '86: Evolutions of the Digital Pacific. Telecommunications-Asia, Americas, Pacific: PTC '86 Proceedings, Jan. 12-15, 1986, Honolulu, Hawaii, pp. 260-265.

K. Yamamoto, "A Home Terminal System Using the Home Area Information Network", IEEE Transactions on Consumer Electronics, vol. CE-30, No. 4, Nov. 1984, pp. 608-616.

"Centrex LAN Can Provide Advanced Network Capabilities Over the Existing Telephone Wires", Communications News, vol. 25, No. 6, Jun. 1988, p. 27.

"Data Over Voice is Solution for Corporate Network", Telephone Engineer and Management, vol. 91, No. 9, May 1, 1987, pp. 67-69.

"Data Carrier System Allows Simultaneous Voice/Data Transmission for PABX Telephone Systems", Computer Design, vol. 21, No. 5, May 1982, pp. 68 and 70.

"Computerized Telephone System Integrates Voice and Data Switching", Computer Design, vol. 20, No. 4, Apr. 1981, 6 pages.

"AT&T's Systemax Premises Distribution System Solves Networking Problems", Fiber Optics Magazine, vol. 12, No. 4, Jul.-Aug. 1990, pp. 14-16.

M.M. Anderson, "Video Services on Copper", Conference: ICC 91, International Conference on Communications Conference Record, Jun. 2-26, 1991, Denver, CO, pp. 302-306.

M. Bastian, "Voice-Data Integration: An Architecture Perspective," IEEE Communications Magazine, vol. 24, No. 7, Jul. 1986, pp. 8-12.

S. Bramblett, "Connect Terminals to Your CPU Over PBX Telephone Lines", EDN vol. 31, No. 5, Mar. 6, 1986, pp. 239-243, 245, 246 and 248.

J.W. Lechleider, "Study of The Feasibility and Advisability of Digital Subscriber Lines Operating at Rates Substantially in Excess of the Basic Access Rate", T1E1.4 Technical Subcommittee (T1E1.4/89-070), 1 page, 1998.

"TeleConcepts . . . Introduces the Just Plug It in Intercom System, "TeleConcepts Brochure, Newington, CT, 2 pages, published before Jul. 3, 1995.

TeleVideo Brochure, 2 pages, published before Jul. 3, 1995.

"Video Transmission System—Send Video Over Ordinary Wire—No Coax Required", Javelin Brochure, 2 pages, published before Jul. 3, 1995.

J. Hofmann, Cable, Television, and the Consumer Electronic Bus, Symposium Record, 15th International TV Symposium, Jun. 11, 1987, Montreux, Switzerland, 9 pages.

C. Valenti, "Study of the Feasibility and Advisability of Digital Subscriber Lines Operating at Rates Substantially in Excess of the Basic Access Rate", T1E1.R Technical Subcommittee (T1E1.4/91-115), Aug. 26, 1991, pp. 2 and 4.

Claim Chart presented in request for reexamination of U.S. Patent No. 6,480,510 request filed Jun. 10, 2009.

Claim Chart presented in request for reexamination of U.S. Patent No. 5,841,360 request filed May 26, 2009.

Claim Chart presented in request for reexamination of U.S. Patent No. 6,480,510 request filed Jun. 10, 2009.

Claim Chart presented in request for reexamination of U.S. Patent No. 5,841,360 request filed May 26, 2009.

G.D. Carse, "New and Future technologies in the Local Telephone Network: The Victoria System", Conference: IEEE International Conference on Communications '86, ICC '86: Integrating the World Through Communications Conference Record, Jun. 22-25, 1986, Toronto, Ontario, Canada, pp. 410-412.

D.G.J. Fanshawe, "Architures for Home Systems", Conference: IEEE Colloquium on Home Systems—Information, Entertainment and Control, Oct. 1, 1990, London, United Kingdom, pp.3/1-3/3.

M. Inoue, et al., "A Home Automation System", IEEE Transactions on Consumer Electronics, vol. CE-31, No. 3, Aug. 1985, pp. 516-527.

S. Motoyama, et al., "A Subscriber Loop Multiplexing System for Integrated Service Digital Networks", Conference: NTC '81, IEEE 1981 National Telecommunications Conference, Innovative Telecommunications-Key to the Future, Nov. 29-Dec. 3, 1981, New Orleans, Louisiana, pp. D5.1.1-D5.1.5.

G. Neumann, Flexible and Cost-Minimising System Concept (Ericsson Digital PABX MD 110), NET Nechrichten Elektronik-Telematik, Special Issue, Mar. 1988, pp. 11, 12, 14 and 15.

A. Pietrasik, et al., "Subscriber Carrier Telephony System 1+1", Wiadomosci Telekomunikacyjne, vol. 17, No. 7-8, Jul.-Aug. 1977, pp. 183-198.

V. Punj, "Broadband Applications and Services of Public Switched Networks", IEEE Transactions on Consumer Electronics, vol. 35, No. 2, May 1989, pp. 106-112.

T. Sodeyama, et al., "Intelligent House", Journal of the Institute of Electronics, Information and Communication Engineers, vol. 72, No. 9, Sep. 1989, pp. 1024-1026.

H. Tanaka, et al., "Telecontrol System VJ-501", National Technical Report, vol. 32, No. 6, Dec. 1986, pp. 809-817.

K. Yamamoto, et al., "New Home Telephone System Using Japanese Home Bus System Standard," IEEE Transactions on Consumer Electronics, vol. 35, No. 3, Aug. 1989, pp. 687-697.

T. Yamazakli, et al., "Home Appliance Technologies," NEC Research and Development. No. 96, Mar. 1990, pp. 292-299.

Funkschau, "CEBus: US Households are Being Networked", No. 9, Apr. 1989, pp. 45-47.

"Shared Services (Data/Voice Network)", Communications News, vol. 25, No. 11, Nov. 1988, pp. 46-47.

A. Artom, et al., "The Possible Use of Customer Loop for New Services During the Transition From Analogue to Digital", Revue F.I.T.C.E., Mar.-Apr. 1981, vol. 20, No. 2, pp. 50-56.

A. Artom, et al., "Medium-Term Prospects for New Servies to the Telephone Customers," Conference Record, Jun. 14-18, 1981, Int'l Conf. on Communications, Denver, CO., pp. 14.4.1-14.4-6.

Hoe-Young Noh, "Home Automation", Korea Information Science Society Review, Apr. 1989, vol. 7 No. 2, pp. 40-44, Republic of Korean. (Translation Provided).

English Language Abstract for Japanese Patent 1-27358 (64-27358) Jan. 30, 1989.

Bellcore: Request for Information: Asymmetrical Digital Subscriber Line (ADSL) Systems That Support Simplex High-Bit-Rate Access and POTS in The Copper Loop Plant; Jun. 1991.

Compaq to Ride The CEBus; by Mark Hachman, EBN Jan. 22, 1996 (1 page).

CEBus Router Testing; IEEE Transactions on Consumer Electronics Nov. 1991, vol. 37 No. 4 (8 pages).

Technical Report TR-001 ADSL Forum System Reference Model; May 1996 (6 pages).

DSLPipe User's Guide; by Ascend Communications, Jun. 3, 1997 (245 pages).

DSLPipe Reference Guide; by Ascend Communications, Jun. 2, 1997 (162 pages).
Ascend DSLPipe-S Features; Posted May 12, 1997 (2 pages).
Broadband Digital Subscriber Line—A Full Service Network for the Copper Plant; Telephony / Jun. 12, 1995, vol. 228 No. 24 (8 pages).
Commtek Intros Video over UTP; Communications Week, Feb. 10, 1992 (3 pages).
Aurelio Amodei, et al., "Increasing the Throughput of the HomePNA MAC Protocol, IEEE, Proceedings of the 29th Annual IEEE International Conference on Local Computer Networks (LCN '04), 8 pages", Nov. 1, 2004, 8 pages (s).
"Home Phoneline Networking Alliance", Interface Specification for HomePNA 2.0 10M8 Technology Link Layer Protocol, (Dec. 1, 1999), pp. 1-39.
"Home Phoneline Networking Alliance", Interface Specification for HomePNA 2.0 10M8 Technology, (Dec. 1, 1999), pp. 1-77.
Paola Bisaglia, et al., Receiver Architectures for HomePNA 2.0, Hewlett Packard Laboratories, Bristol, U.K., Oct. 17, 2001.
Loh, L.; Ozturk, Y.; Quality of Support and Priority Management in HomePNA 2.0 Link Layer.quadrature..quadrature. Computers and Communication; Jun. 30-Jul. 3, 2003. (ISCC 2003). Proceedings. Eighth IEEE International Symposium; pp. 861-866 vol. 2.
Phoneline / HPNA / HomePNA Networks, http://www.homenethelp.com/web/howto/HomeNet-HPNA.asp (visited Jul. 29, 2003) (3 pages).
Anonymous, HomePNA Specification 1.0 Field Tests Status, Mar. 1999, Home Phoneline Networking Alliance, Inc, pp. 1-6.
Simple, High-Speed Ethernet Technology for the Home, White Paper, Home Phoneline Networking Alliance, Jun. 1998, pp. 1-11.
Information on Home PhoneLine Networking Alliance (Home PNA), dated Jun. 1998 and before.
Office Action from the Japanese Patent Office dated Oct. 25, 2008 for application No. 2004-567490.
"The DSL Sourcebook," Paradyne Corporation, Copyright 2000, DSL-Book-3.0-0900, 98 pages.
Olshansky, "A Full Service Network for the Copper Plant," Telephony, 1985, p. 52-60.
Instant Network Rules on Phone Lines, Electronic Design, 1987.
J. Alves, "Data over Voice—A Low Cost LAN Alternative", Communications Show and Conference, MEOM 87, 1987 pp. 13-15.
M. Devault, et al., "Resaux Domestiques et Terminaux Audiovisuels Numeriques," L'Echo Des Recherches, No. 126, 1986, pp. 37-46.
M.G. Vry, et al., "The Design of a 1+1 System for Digital Signal Transmission to the Subscriber," NTG-Bachberichte, vol. 73, 1980, pp. 36-40.
M. Boubekker, "Bandwidth Reduction for the Transmission of Sign Language Over Telephone Lines," Proceedings of the SPEI—The International Society of Optical Engineering, vol. 1001, Part 1, 1988, pp. 223-230.
C. Dougligeris, et al., "Communications and Control for a Home Automation System," Conference: IEEE Proceedings of the Southeastcon '91, vol. 1, p. 171-175, 1991.
N.C. Hightower, "Integrated Voice, Data and Video in the Local Loop," IEEE 1986, pp. 915-919.
H. Nishi, te al., "Control of a Star/Bus Key Telephone System," NTT R & D, vol. 39, No. 8, 1990, pp. 122, 1222, 1224-1228.
D. L. Waring, "The Asymmetrical Digital Subscriber Line (ADSL): A New Transport Technology for Delivering Wideband Capabilities to the Residence." Globecom '91, IEEE, 1991, pp. 1979-1986.
Freeman, "Telecommunication Transmission Handbook," 2.sup.nd Ed., Cover, 1981, pp. xi-xxvii, Chapter 3 (pp. 79-127), Chapter 5 (pp. 172-252), Chapter 6 (pp. 253-288).
M. Coronaro, el al., "Integrated Office Communication System," Electrical Communication, 1986, pp. 17-22, vol. 60, No. 1, EACE Research Center, Pomezia, Italy.
Chow et al., "A Multi-drop In-House ADSL Distribution Network," IEEE 1994, pp. 456-460.
Twisted Pair Physical Layer and Medium Specification; Revision: IS-60 8-18-95, 1995 (49 pages).
Introduction to the CEBus Standard; Revision 2-5-95 Draft copy, 1995 (19 pages).
Broadband Network Technology—An Overview for the Data and Telecommunications Industries; by Edward Cooper, Copyright 1984, p. 51-52 (4 pages).
21145 Phoneline/Ethenet Lan Controller Intel Corporation, COPYRGT. 1999, http://developer.intel.com/design/network/21145.htm.

* cited by examiner

Figure 1 (Prior-Art)

Figure 2 (Prior-Art)

Figure 9 (Prior-Art)

METHOD AND SYSTEM FOR PROVIDING DC POWER ON LOCAL TELEPHONE LINES

CROSS REFERENCE TO RELATED APPLICATIONS

This is a continuation of copending application Ser. No. 10/403,526, filed on Apr. 1, 2003, the disclosure of which is incorporated herein by reference.

FIELD OF THE INVENTION

The present invention relates to the transmission of electrical power, and, more particularly to the provision of local Direct-Current (DC) power utilizing active telephone wiring.

BACKGROUND OF THE INVENTION

Conventional analog telephony (also known as "Plain Old Telephone Service", or "POTS") is based on a central office (CO) or private branch exchange (PBX) connected to telephone sets using a wire pair known as a 'subscriber loop'. In most cases, the telephone set side of the wiring in a building is terminated using telephone outlets, into which the telephone sets are connected. The PBX/CO provides a low-voltage (usually around 48 VDC) low-power direct current in order to detect a telephone off-hook/on-hook condition of a telephone connected to that line. In a conventional analog telephone, lifting the handset off the cradle (off-hook condition), closes a switch that places a resistive load across the line, causing a direct current to flow in the subscriber loop. This current is detected at the PBX/CO to signal the telephone off-hook condition, and also for legacy 'Pulse Dialing' switching systems. Although originally intended only for detecting the telephone off-hook condition and Pulse Dialing, this DC power has also been widely used to provide low-voltage electrical power for other purposes, such as electronic circuitry used in telephonic devices and related apparatus associated with use of the telephone lines for communication and data transmission.

For purposes of this invention, any facility providing a local telephone line to one or more telephones is considered to be functionally equivalent to a Private Branch Exchange (PBX), a Central Office (CO), or similar system, and is herein denoted by the term "PBX/CO".

FIG. 1 is a schematic diagram illustrating a basic in-house PBX/CO-to-telephone connection arrangement 10. A PBX/CO 11 has a 2-wire telephone line local or subscriber loop constituted by wiring 14 to which telephone sets 13a and 13b are connected via respective 2-wire connecting lines. A "telephone set" includes, but is not limited to, telephones, fax machines, dial up modems, and any other telephonic devices. In most cases, the telephone sets connect to the telephone wiring by means of telephone outlets 12a and 12b, respectively.

While wiring 14 in a premises is normally based on a serial or "daisy-chained" topology, wherein the wiring is connected from one outlet to. the next in a linear manner; other topologies such as star, tree, or any arbitrary topology may also be used. Regardless of the topology, however, the telephone wiring system within a residence always uses wired media: two or four copper wires terminating in one or more outlets that provide direct access to these wires for connecting to telephone sets.

The term "telephone outlet" herein denotes an electromechanical device that facilitates easy, rapid connection and disconnection of external devices to and from telephone wiring installed within a building. A telephone outlet commonly has a fixed connection to the wiring, and permits the easy connection of external devices as desired, commonly by means of an integrated connector in a faceplate. The outlet is normally mechanically attached to, or mounted in, a wall. A "telephone outlet", as used herein, can also be a device composed of a part that has a fixed connection to the wiring and is mechanically attached to, or mounted in, a wall, and a part that is removably mechanically attached and electrically connected to the first-mentioned part, i.e. a device in which the first part is which is a jack or connector used for both electrical connection and mechanical attachment. The term "wall" herein denotes any interior or exterior surface of a building, including, but not limited to, ceilings and floors, in addition to vertical walls.

It would be desirable to have the possibility of carrying power over active telephone lines in addition to the telephone signals. This would, among other things, obviate the need to install additional cabling in installations wherein telephone wiring already exists. For example, power carried over a telephone line may be used to power repeaters, as well as any other mediation devices throughout the telephone wiring, multi-features telephone sets, and other telephony related and non-telephony devices. The powering is usually required when the connected telephones are off-hook and on-hook.

U.S Pat. No. 6,216,160 to Dichter and US Patent Application Publication 2002/0003873 to Rabenko et al. disclose carrying AC power over active telephone wiring, using frequency domain multiplexing (FDM) in order to avoid interference with the telephony signals, as well as other signals carried over the telephone wiring. This approach to supplying power has drawbacks due to the radiation limitation imposed on non-shielded telephone wiring, for example by the FCC. Furthermore; such implementation requires very complex and expensive filtering circuits.

U.S. Pat. No. 6,157,716 to Ortel discloses a technique for carrying DC power over active telephone lines. Based on a diode and on the impedances exhibited in the various on- and off-hook states, DC current can be imposed and extracted using the telephone lines. Using DC powering reduces the radiation and filtering problems associated with the AC powering. However, the technique disclosed by Ortel allows only for a very limited amount of power to be carried over the telephone wiring.

A general prior art system 20 is shown in FIG. 2 and differs from system 10 by including a Power Supply Coupler (PSC) 21, which is supplied with power from power supply 22 and couples that power onto active telephone wiring 14. Power supply 22 is powered from the utility AC mains via a standard plug 25. A load Coupler 23 extracts the power from the telephone line and feeds a load 24. In such a system, power supply 22 feeds load 24 using the active telephone wiring 14, with the goal of minimum interference to the telephone signals carried simultaneously over the wiring 14.

It would be highly advantageous to have a system for providing increased amounts of DC power to power remote devices via active telephone lines, such as those served by a PBX/CO in a building or within an office. This goal is met by the present invention.

BRIEF SUMMARY OF THE INVENTION

The present invention provides a system and a method for achieving the goal of providing adequate amounts of electrical power over active telephone lines to power loads such as extensive data processing and handling circuitry.

The invention is based on separating signals supplied to a subscriber loop into an AC signal and a DC signal. The AC signal, or component, is the telephone signal routed over the system from the PBX/CO to the telephone set(s). The DC signal, or component, is blocked and replaced with a separately generated DC signal, carried over the wiring along with the AC signal. A load can be connected to the wiring via a coupler which passes the DC signal, without affecting the AC signal. This allows loads to be powered by a DC signal in a manner independent of the PBX/CO DC characteristics. A telephone set can be connected to the wiring through a conventional telephone coupler that passes the AC signal and blocks or processes the DC signal to adapt to the telephone DC characteristics. The present invention thus allows a DC signal having any desired voltage level and power content to be imposed on a subscriber loop without interfering with the telephone signals.

To maintain the ability of the PBX/CO to detect a telephone off-hook condition in a telephone set connected to a line that has, for purposes of the present invention, been separated from the PBX/CO's DC current loop, the present invention further provides for non-DC dedicated telephone off-hook signaling carried over the wiring from the telephone set to the PBX/CO. For this purpose, there is provided an off-hook detection device connected to the telephone terminals for generation of a off-hook tone over the wiring when an off-hook condition exists. This tone is detected by a device connected to the wiring, and allows generation and transmission of a DC off-hook state signal to the PBX/CO, thus providing full off-hook and on-hook functionalities.

A system according to the invention can be partially or fully integrated into a telephone set, a PBX/CO, distinct stand-alone devices, or telephone outlets.

A system according to the present invention is suitable for providing local power via telephone lines within a building or office, or in any other environment whereby telephone service is provided by a Central Office, a Private Branch Exchange, or similar facility. Similarly, the system can be used to carry telephony service over DC-carrying wire pair. The descriptions of the present invention are therefore exemplary and do not limit the application of the invention to telephone lines connected specifically to private branch exchanges, central offices, or any other particular facility.

BRIEF DESCRIPTION OF THE DRAWINGS

The invention is herein described, by way of example only, with reference to the accompanying drawings, wherein.

DETAILED DESCRIPTION OF THE INVENTION

Figure 1:
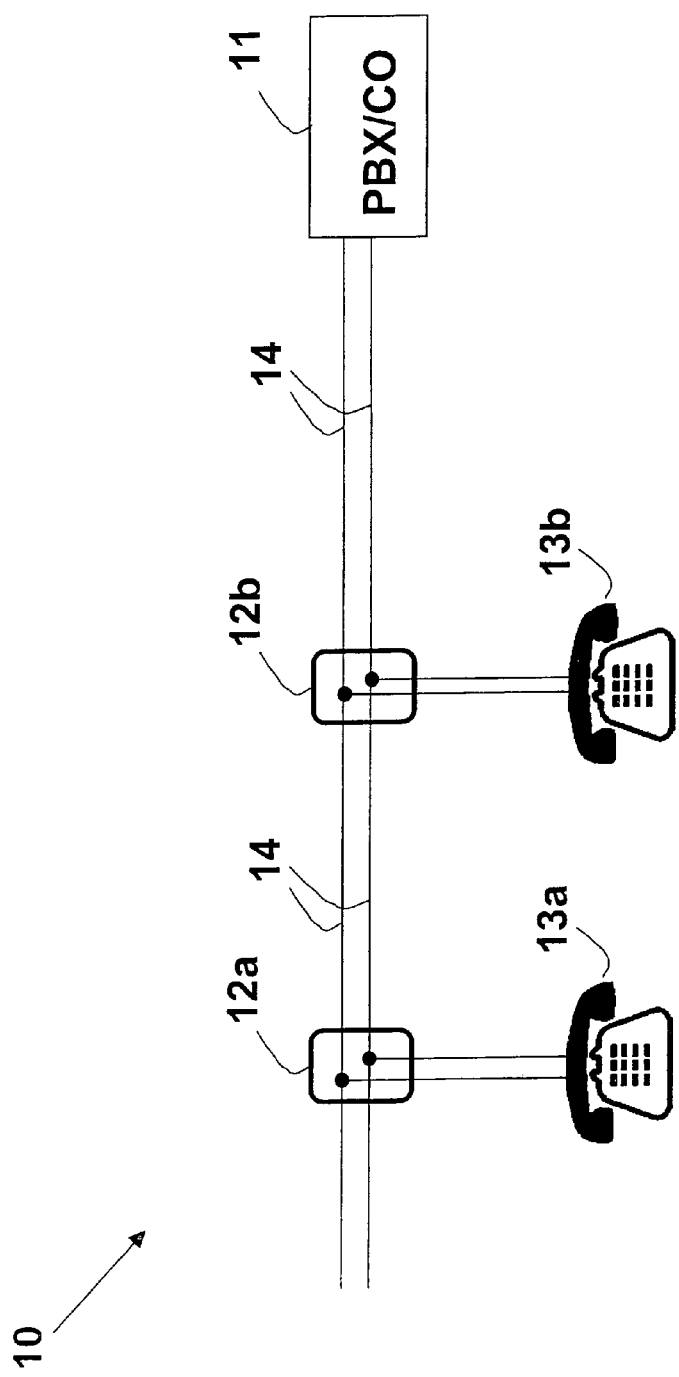
FIG. 1 is a schematic diagram of a prior-art PBX/CO-to-telephone connection common in houses and offices.

The principles and operation of systems for providing local power over telephone lines according to the present invention may be understood with reference to the drawings and the accompanying description. The drawings and description are directed to principles of the invention. In actual practice, a single component can implement one or more functions; alternatively, each function can be implemented by a plurality of components and circuits. In the drawings and description, identical reference numerals indicate those components that are common to different embodiments or configurations.

An analog telephony signal may comprise many components, including voice (audio signal), ringing, DTMF signals, and DC (commonly −48 VDC) used for on-hook and off-hook indicators, pulse dialing and powering the telephone set. The invention calls for separating the DC signal (hereinafter referred to 'DC telephony signal' or 'DC signal') from all other signals (non-DC signals, hereinafter collectively referred to 'AC telephony signal' or 'AC signal'), and while the AC signal is being transparently carried over the telephone wiring, distinctly processing the DC signal, as will be explained in detail below.

AC/DC Separation

Figure 2:
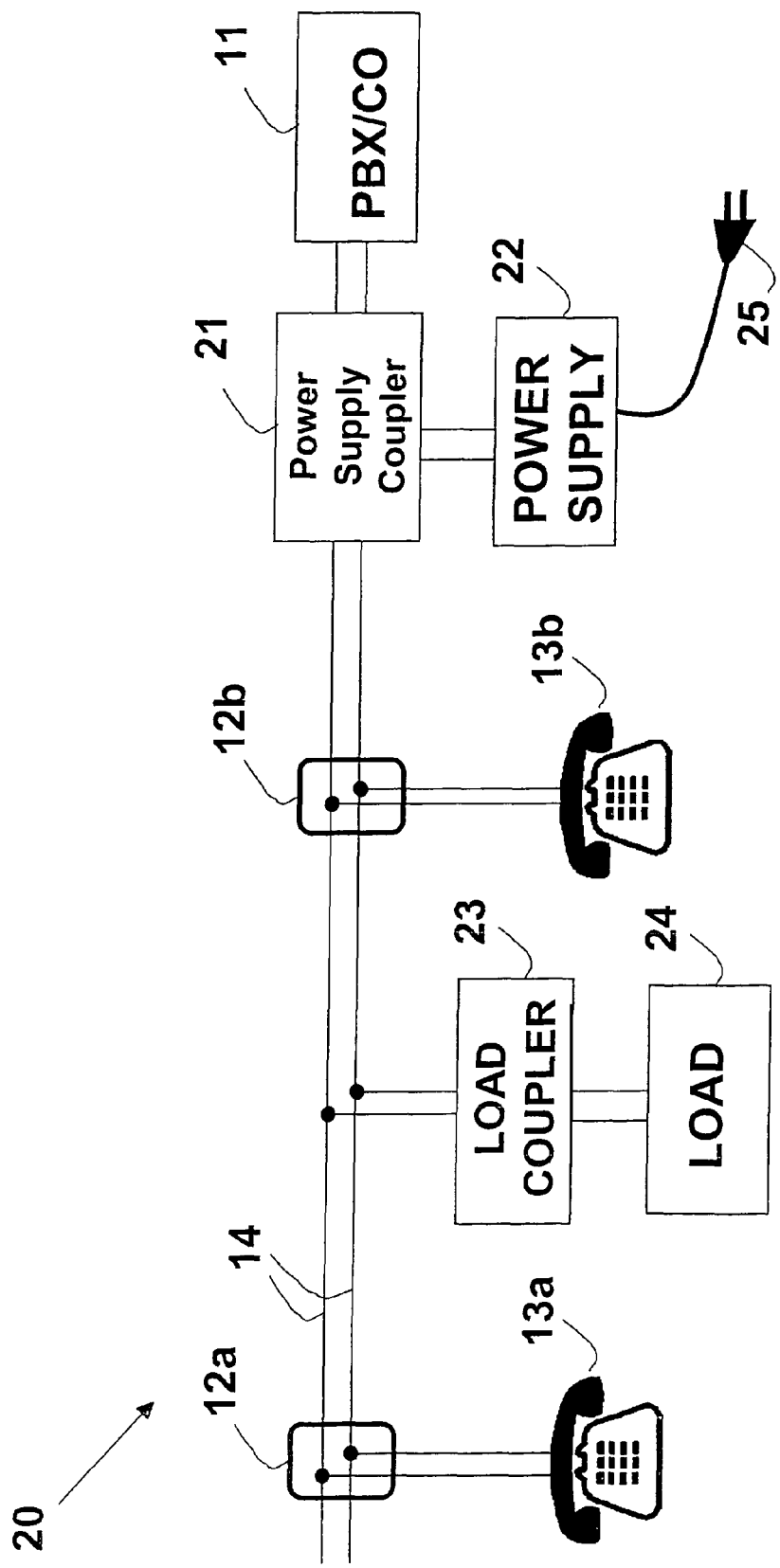
FIG. 2 is a schematic diagram illustrating a prior-art scheme for providing electrical power over local telephone lines.
Figure 3:
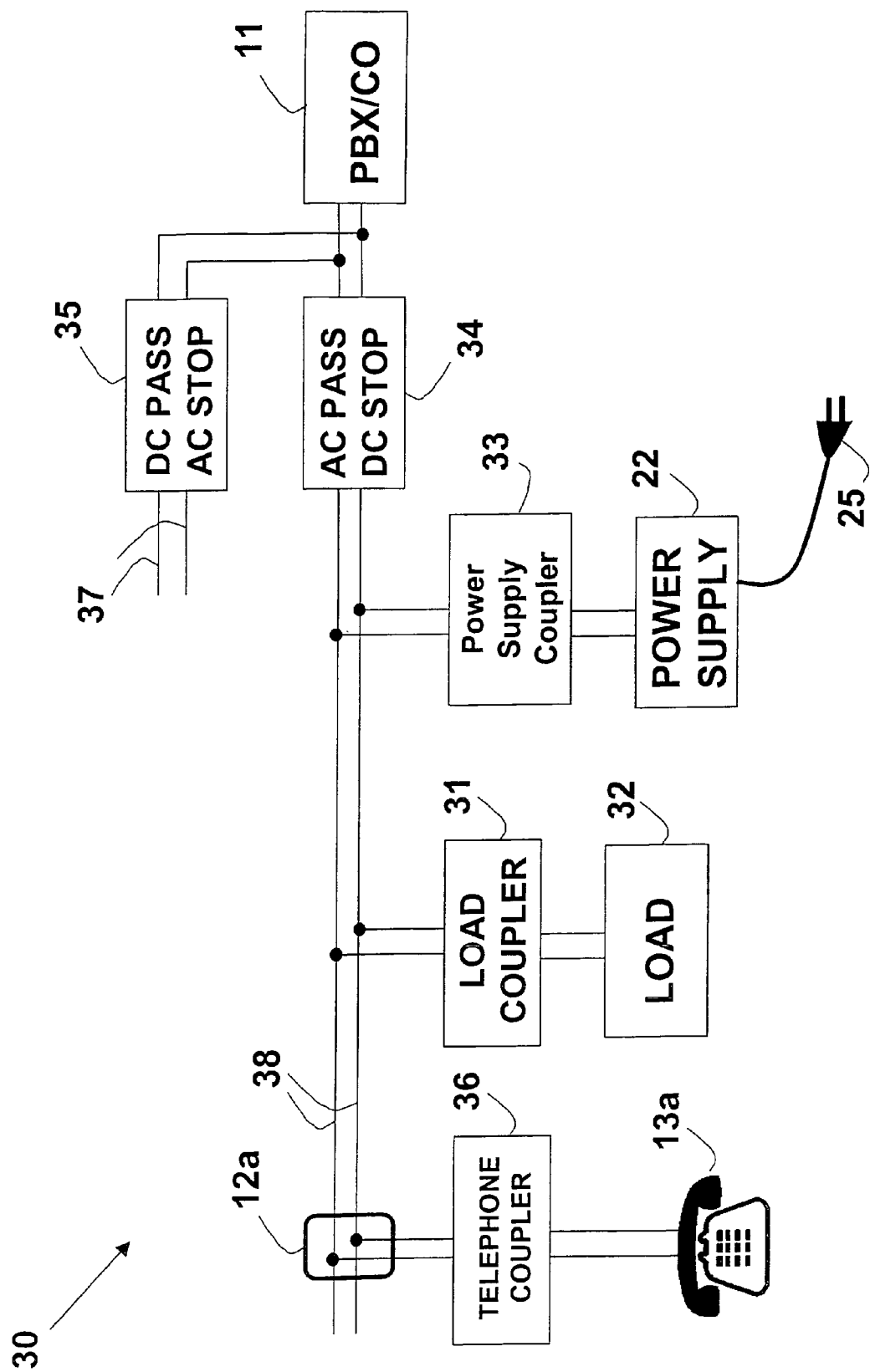
FIG. 3 is a schematic diagram of a telephone installation according to the present invention, showing how the DC power originally supplied by the PBX/CO to the telephone is separated and replaced by power from a dedicated local power supply.

The invention will be now explained in greater detail with reference to system 30 shown in FIG. 3. In this system, an AC Pass/DC Stop device 34 is inserted in series between the PBX/CO 11 and telephone wiring 38, which corresponds to wiring 14 of FIGS. 1 and 2. Device 34 is fully AC transparent to allow the AC signal to follow through to wiring 38, while stopping the DC component of the telephone signal. Similarly, a DC Pass/AC Stop device 35 is also connected to PBX/CO unit 11. This device is fully DC transparent to allow the DC signal to follow through to a connection 37, while stopping the AC component of the telephone signal coupled to PBX/CO 11. AC Pass/DC Stop device 34 may include, but is not limited to, components such as capacitors and transformers. Similarly, DC Pass/AC Stop device 35 may include, but is not limited to, components such as inductors and chokes. A DC power supply 22 receives power from the utility AC mains via a plug 25 and is coupled to wiring 38 via a power supply coupler 33 whose main function is to impose DC power on telephone wiring 38 without interfering with, or being interfered with by, the AC signal carried over wiring 38. A load 32 is connected to wiring 38 via load a coupler 31, which extracts the power from wiring 38 without interfering with, or being interfered with by, the AC signal carried over these lines. Telephone set 13a is optionally connected to telephone wiring 38 via a telephone coupler 36, operative to present a conventional telephone interface to telephone set 13a, without interfering with the DC power carried over wiring 38. For example, the coupler 36 may comprise a DC/DC converter allowing for providing DC power suitable to the telephone operation. Other functions of coupler 36 will be described below.

AC Pass/DC Stop device 34 and telephone coupler 36 are transparent to the AC signal, and DC Pass/AC Stop device 35, power supply coupler 33 and load coupler 31 do not affect that signal. Thus, the AC signal properly connects the PBX/CO 11 to telephone set 13a. The DC telephony signal from PBX/CO 11 is decoupled from the DC power signal produced by the power supply 22. The DC telephony signal is not routed over telephone wiring 38, but rather routed to connection 37 via DC Pass/AC Stop device 35. As a substitute, the DC power signal generated by power supply 32 and consumed by load 32 is carried over wiring 38. It should be noted that in such configuration there is no telephony related limitation to the power that can be carried by the telephone line 38, thus allowing for high DC voltage and power levels to be carried.

Telephone Off-Hook Condition Handling

As noted previously, a telephone off-hook state and also pulse dialing signals are detected by the PBX/CO 11 on the basis of a current flow in the subscriber loop. However, since system 30 shown in FIG. 3 does not allow direct DC coupling between the PBX/CO 11 and telephone set 13a, an off-hook condition cannot be detected by the PBX/CO. Thus, system 30 may be used in telephone systems not using off-hook signaling, such as intercom or continuous connection.

Figure 4:
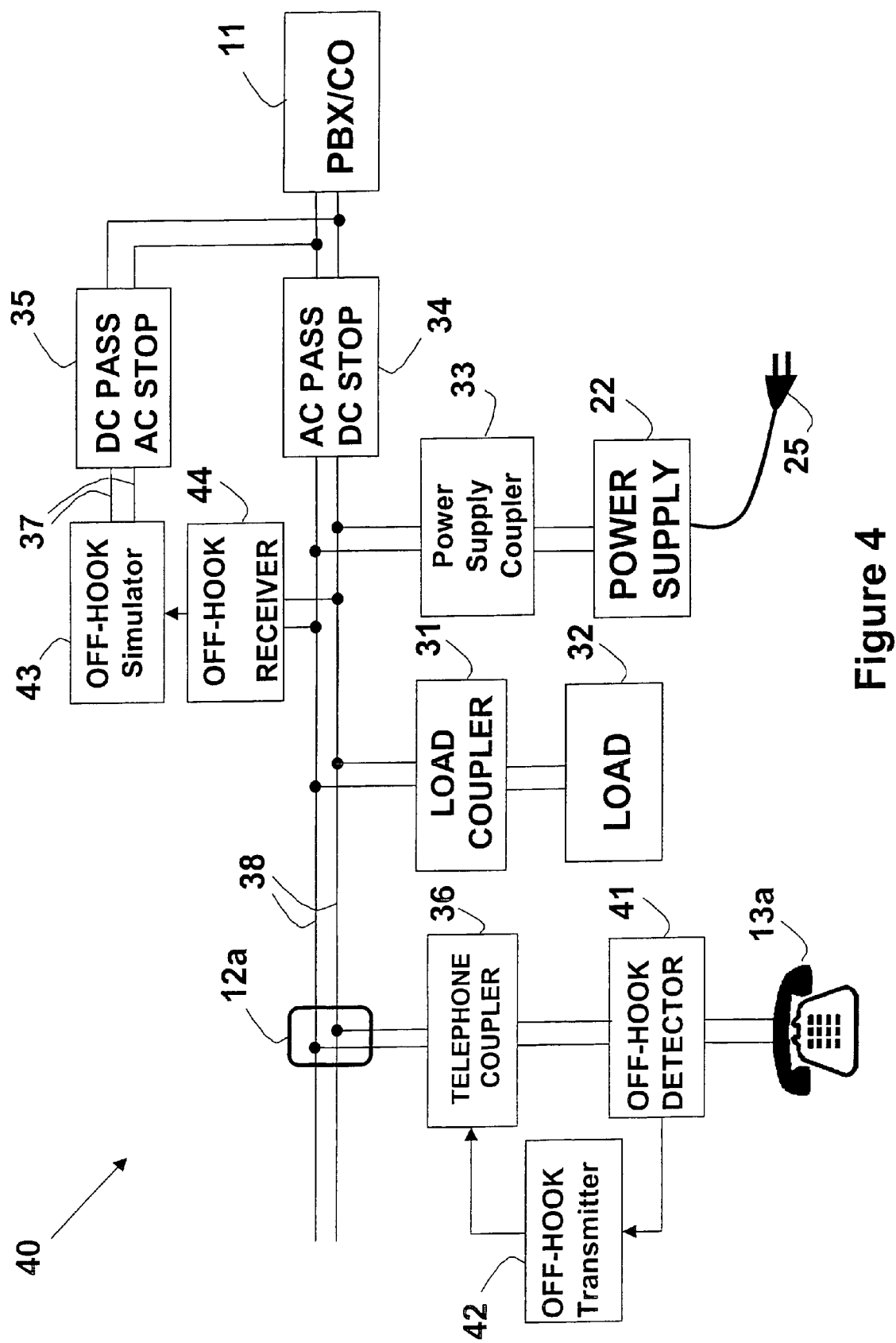
FIG. 4 is a functional block diagram illustrating the handling of a telephone off-hook condition according to the present invention.

A system 40 providing off-hook detection is shown in FIG. 4. In order to allow detection of the off-hook state, an off hook detector 41 is added between telephone coupler 36 and telephone set 13a. Detector 41 functions to detect an off-hook condition of telephone set 13a. Such detection may be effected by measuring the current flowing through the telephone set 13a (similar to the method used by the PBX or CO) or measuring the voltage drop across the telephone set 13a connections. While off-hook detector 41 in FIG. 4 is connected in series to with telephone set 13a, a parallel connection may also be appropriate, according to the detection method used.

Upon sensing an off-hook state, detector 41 notifies off-hook transmitter 42 of such state. Transmitter 42 is operative to transmit a signal over telephone wiring 38 indicating the off-hook detection. This signal is picked up by an off-hook receiver 44, which is connected across telephone wiring 38. Off hook receiver 44 then triggers an off-hook simulator 43 that produces a signal simulating the off-hook state and transmits that signal to the PBX/CO connected via DC Pass/AC Stop device 35. In a simple implementation, off-hook simulator 43 induces a current flow in connection 37 that is similar to the current flow that would have occurred if telephone set 13a were to be directly DC connected to PBX/CO 11. In this way, an off-hook condition of telephone set 13a is reliably sensed by PBX/CO 11. Since on-hook state exists at all times when off-hook state is not sensed, the full telephony service operation is a fully functional equivalent to the performance of the system shown in FIG. 1.

The off-hook indication signal flowing from transmitter 42 to receiver 44 does not make use of any DC signals as used in the prior-art, but rather uses AC type signaling. Non-limiting examples of such transmission method may include:

a. A tone sent over wiring 38 (similar to DTMF signaling).

b. In the case wherein a data network signal is also carried over the telephone wiring, the off-hook condition may be encoded as a message carried over the data network.

c. Transmitter 42 can exhibit an impedance change with respect to a specific frequency, sensed by the receiver as drawing current (or current change) at this frequency.

In all of the above cases, the off-hook signaling may be continuous, wherein the off-hook indication is being transmitted as long as the off-hook condition exists, or may be used as a status change indication, wherein shifting from on-hook to off-hook and vice versa is indicated.

While the invention has been described with respect to a single telephone set 13a, it will be appreciated that the invention equally applies to any number of such telephones, wherein each telephone is coupled to a coupler 36, detector 41 and transmitter 42. Alternatively, multiple telephone sets can be connected to a single set of the above units. Similarly, while the invention has been described with respect to a single load 32, it will be appreciated that the invention equally applies to any number of such loads, wherein each such load is coupled by a coupler 31.

The Off-Hook signaling mechanism described above in system 40 is composed of Off-Hook detector 41 and Off-Hook transmitter 42 on the telephone side, together with Off-Hook receiver 44, Off-Hook simulator 43 and DC Pass/AC Stop device 35 on the PBX/CO side. While this Off-Hook signaling mechanism is shown to work as an adjunct to power delivery system 30 as described in FIG. 3, it should be obvious that such a mechanism can equally be used in any embodiment wherein DC powering and loading is not used for Off-Hook state detection. For example, in some environments a galvanic isolation is required, obviating the need for carrying DC power over the wiring. In such a case the Off-Hook signaling mechanism described can equally apply.

While the invention has been described with respect to an exchange (PBX) or a PSTN (Public Switched Telephone Network) Central Office (CO), it will be appreciated that the invention equally applies to any telephone line source into which a telephone set can be connected. Both circuit switching and packet switching can be used to originate the telephone signal. For example, a VoIP MTA (Multimedia Terminal Adaptor), either as standalone or integrated within a cable-modem or set top box can be used, wherein the telephony service is originated as part of the CATV network. Similarly, VoDSL (Voice over DSL) based telephony can also be used as a telephone line source.

While the invention has been described with respect to DC power supply 22 being fed from the AC utility mains via plug 25, it will be appreciated that the invention equally applies to any AC power supply than converts AC to DC. Furthermore, direct DC feeding may also be used, either fed directly to coupler 33 and obviating the need for power supply 22 or wherein power supply 22 perform DC/DC conversion. In both cases, the power may be originated in the AC utility mains, a battery or externally fed from any network (e.g. HFC network). For example, a UPS (Uninterruptible Power Supply) system can be used, ensuring the telephony service operation even in the case of mains power outage. Also, the input to power supply 2 can be hard-wired to the power system rather than being connected by a plug.

Figure 5:
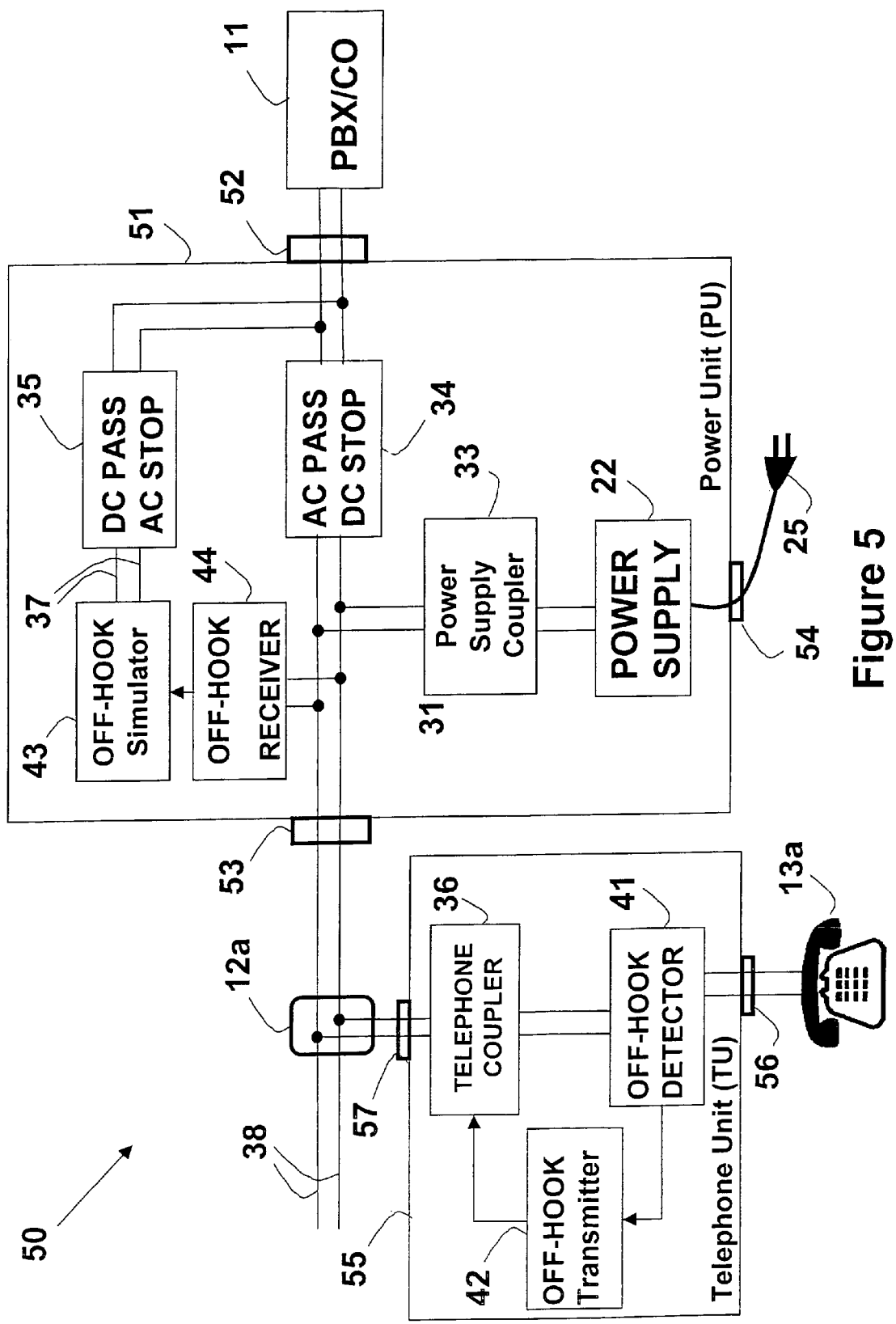
FIG. 5 is a functional block diagram illustrating the grouping of the functions according to the present invention into a Power Unit (PU) and a Telephone Unit (TU).

In general, the functions performed by system 40 can be grouped into two groups: power insertion functions and telephone set functions. The power insertion functions refer to power supply 22, power supply coupler 33, AC Pass/DC Stop device 34, DC Pass/AC Stop device 35, Off-Hook simulator 43 and Off-Hook receiver 44. For simple installation and implementation, it can be beneficial to integrate part or all of these functions into a single device, referred to hereinafter as a 'Power Unit' (PU) 51 shown as part of system 50 in FIG. 5, performing all of the above functions. PU 51 comprises of at least three ports, as follows:

a. Incoming telephone line interface 52 that allows for the connection of power unit 51 to a PBX/CO 11.

b. Outgoing telephone line interface 53 for connecting power unit 52 to telephone wiring 38, into which load 32 and telephone set 13*a* are coupled.

c. Power interface 54 that allows power to be supplied to power unit 51, e.g., from AC utility mains via plug 25.

As explained above, in the case wherein suitable DC power is directly fed, power unit 22 may be obviated. Similarly, other functions included in power unit 52 may be eliminated or integrated into other devices.

While the invention has been described with respect to Power Unit 51 being a standalone and distinct device, it will be appreciated that the invention equally applies to cases where Power Unit 51 is partially or fully integrated into other devices. Specifically, power unit 51 may be integrated into any unit having a telephone line interface. In one embodiment, power unit 51 is integrated into PBX/CO 11 unit. For example, power unit 51 may be integrated into a cable modem or set top box used in the CATV industry and employing VoIP MTA, as well as VoDSL equipment.

In another embodiment, power unit 51 is integrated into wiring devices, such as demarcation points, communication closets, outlets and junction boxes. In a preferred embodiment, power unit 51 is integrated into a telephone outlet. In such a system, the 2-wire cable connecting the telephone set to the outlet can carry both the telephony signal and power (as well as other signals, such as data communication signals, if applicable).

Figure 6:
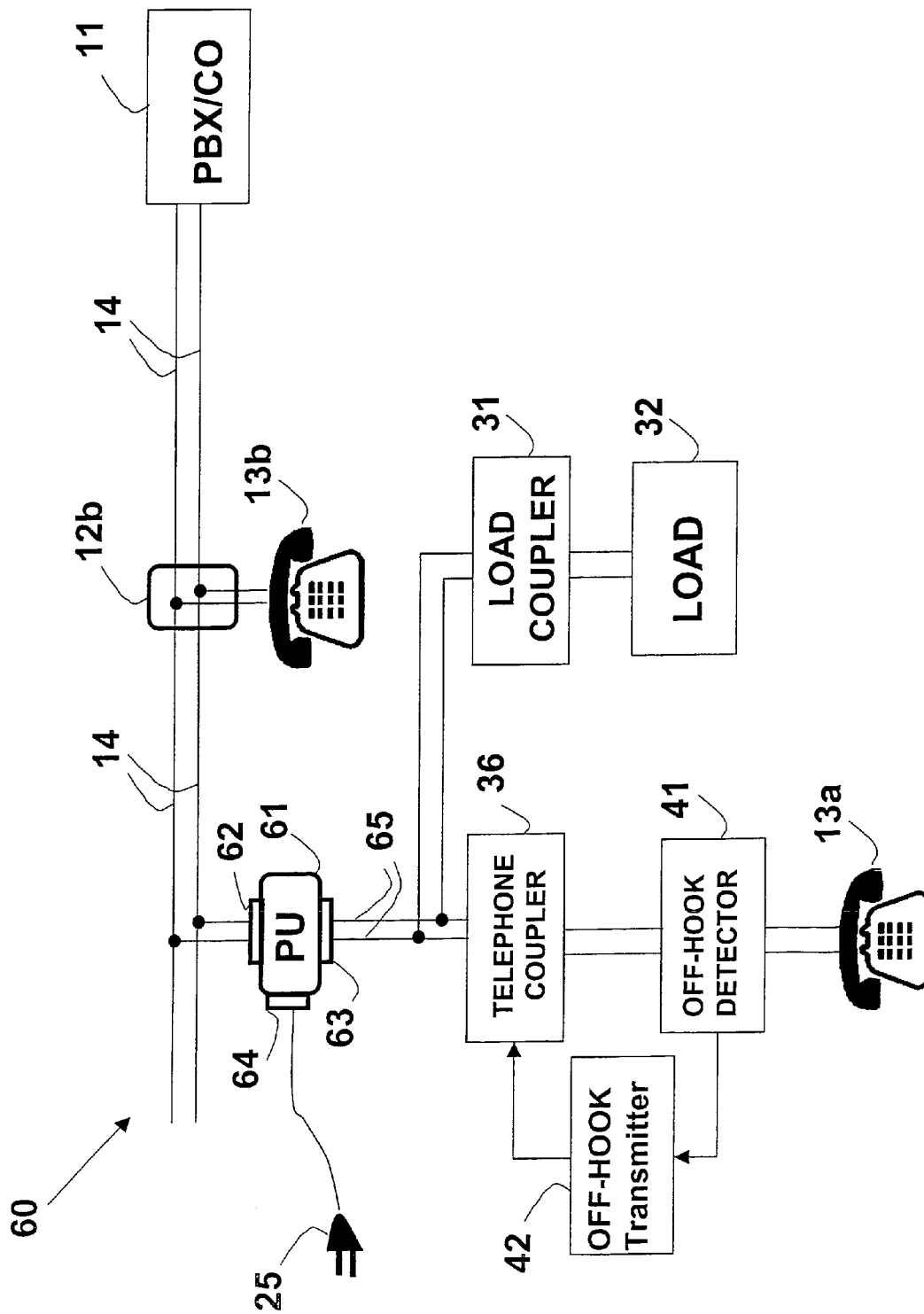
FIG. 6 is a functional block diagram illustrating a sample embodiment according to the present invention.

A system 60 similar to system 50 modified to include such an outlet is shown in FIG. 6. System 60 includes a PU 61 that may be identical to power unit 51 integrated within an outlet. Interface 62, correlated with interface 52 of power unit 51, connects PU 61 to telephone wiring 14, preferably an existing in-wall telephone wire pair. PU 61 is AC powered from mains via plug 25, connected to interface 64, which correspond to interface 54 of power unit 51. Telephone set 13*a* and load 32 are connected via a wire pair 65, connected to interface 63 of PU 61, corresponding to interface 53 of power unit 51. In such a configuration, single wire pair 65 is used to carry both telephony and power to telephone set 13*a*, simultaneously with power to load 32.

Similarly, the functions associated with the telephone set can be grouped into a standalone, distinct device. Such a unit 55 is shown as part of system 50 in FIG. 5. Telephone coupler 36, Off-Hook detector 41 and Off-Hook transmitter 42 are all integrated into Telephone Unit (TU) 55. Such a TU 55 comprises two ports:

a. Telephone wiring interface 57, connecting TU 55 to PU 51 via telephone wiring 38 and outlet 12*a*; and b. Telephone set interface 56, preferably using a standard telephony connector (e.g. RJ-11 in North America), connecting the TU to a telephone set 13*a*.

According to one embodiment, TU 55 is a standalone, distinct device. However, since an additional device may be neither aesthetic nor easy to handle, other embodiments involve integrating TU 55 into telephone set 13*a*, wherein the need for an external module is obviated. However, in both cases of standalone and telephone integrated implementations, there is a risk of directly connecting a telephone set (regular, non modified) directly to the outlet, thus connecting to a power level that may damage the unit. Hence, according to preferred embodiments TU 56 is integrated into an outlet, preferably a telephone outlet. In such a configuration, no external distinct device is required, and the telephone set can be connected to the outlet without any need for special measures.

While the invention has been described with respect to a single general load 32, it will be appreciated that multiple loads may be employed. In some embodiments of the invention, load 32 represents the power required to operate some or all functions of telephone set 13*a*. For example, telephone set 13*a* may consists of a fax machine, cordless telephone, answering machine, multi-function telephone, or any other power consuming functionality, wherein the conventional power derived from the telephone line during off-hook condition may not suffice. In the prior-art, such power requirements are supplied by either a battery or via the AC power mains, usually using a small transformer. Powering via the telephone lines according to the invention obviates the need for any additional power supply such as battery or AC power mains connection.

In all cases wherein the power carried over the telephone wiring according to the invention is used for powering telephone set functions, load coupler 31 may be implemented in the following forms:

a. A standalone distinct unit powered by connection to the telephone wiring and feeds the telephone set.

b. Integrated into Telephone Unit (TU) 55 device.

c. Integrated into an outlet.

Figure 7:
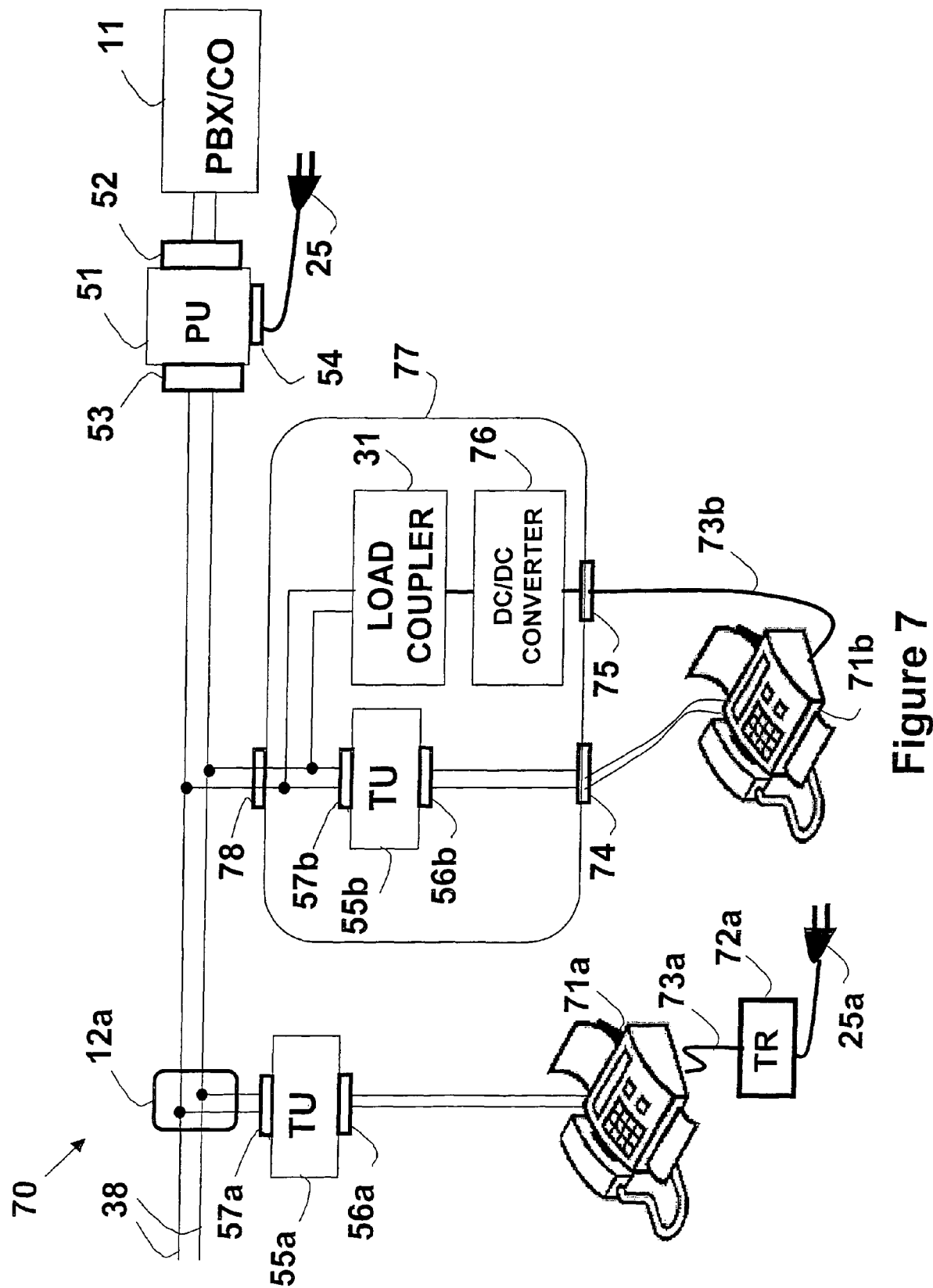
FIG. 7 is a functional block diagram illustrating a sample embodiment according to the present invention wherein the power is also used to power a telephone set.

The latter case is represented by system 70 in FIG. 7. The telephone sets shown are fax machine 71*a*, 71*b*, which commonly require an external power source for their normal operation. In most cases, such power is provided by a transformer (which may be internal to the unit), which is fed from the AC utility mains. Such an arrangement is shown for fax 71*a*, powered from the mains by plug 25*a*, via transformer 72*a* connected to fax 71*a* via connection 73*a*. The telephone connection of fax 71*a* makes use of TU 55*a* as described above with reference to FIG. 5.

System 70 also has an outlet 77, integrating a TU. 55*b*, a load coupler 31 and, optionally, a converter 76. Outlet 77 is coupled via interface 78 to telephone wiring 38, carrying both power and telephony signals according to the invention. Within outlet 77, the telephone wiring is routed to TU 55*b*, via its interface 57*b*. Port 74 of outlet 77, preferably using a standard telephone connector (e.g. RJ-11 in North America) connects to output 56*b* of TU 55*b*, thus allowing for normal telephone connection according to the invention. Simultaneously, telephone-wiring port 78 is also connected to load coupler 31. Coupler 31 extracts the power only from the connection, and feeds it via port 75 to power interface 73*b* of fax 71*b*. As such, transformer 72 is rendered unnecessary. Furthermore, the connection of fax 71*b* to outlet 77 is simpler, since there is no need for a nearby power outlet, and both cables connected to fax 71*b* are terminated in the same outlet 77. Since in most cases the voltage level required for the fax is much lower that the voltage level carried over the telephone lines (e.g. 9-12 VDC required for the fax operation, while the voltage level over the telephone lines may exceed 40 VDC), DC/DC converter 76 may be required in order to adapt the different voltage levels.

While outlet 77 has been described in FIG. 7 with respect to powering telephone equipment, it will be appreciated that power interface 75 can equally feed any general load. Furthermore, load coupler 31 within outlet 77 may be used to power the active circuitry of TU 55*b*, if required.

Figure 8:
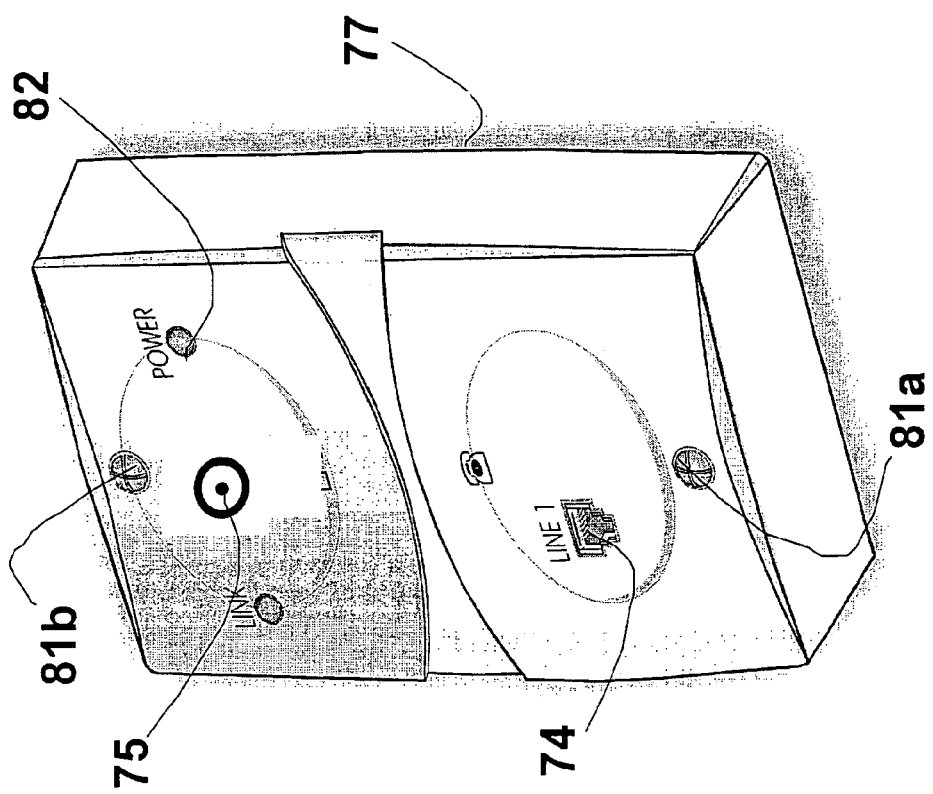
FIG. 8 is a pictorial view of an outlet according to the present invention.

A pictorial view of one example of outlet 77 is shown in FIG. 8. The outlet is shaped to be usable as a substitute for a regular telephone outlet in North-America, including two screws 81*a* and 81*b* for tightening. Outlet 77 is provided with a connector 74, which can be of RJ-11 type, and a circular type power connector 75, similar to common DC jacks. In addition, an indicator 82 is provided to show the presence of power at the outlet.

Home Networking over Telephone Wiring

It is often desirable to use existing telephone wiring simultaneously for both telephony and data networking. In this way, establishing a new local area network in a home or other building is simplified, because there is no need to install additional wiring.

The concept of frequency domain/division multiplexing (FDM) is well-known in the art, and provides means for splitting the bandwidth carried by a wire into a low-frequency band capable of carrying an analog telephony signal and a high-frequency band capable of carrying data communication or other signals. Also widely used are xDSL systems, primarily Asymmetric Digital Subscriber Loop (ADSL) systems.

Examples of relevant prior-art in this field are the technology commonly known as HomePNA (Home Phoneline Networking Alliance), disclosed in international patent document WO 99/12330 to Foley and in U.S. Pat. No. 5,896,443 to Dichter. Dichter and others suggest a method and apparatus for applying a frequency domain/division multiplexing (FDM) technique for residential telephone wiring, enabling the simultaneous carrying of telephony and data communication signals. The available bandwidth over the wiring is split into a low-frequency band capable of carrying an analog telephony signal, and a high-frequency band capable of carrying data communication signals. In such a mechanism, telephony is not affected, while a data communication capability is provided over existing telephone wiring within a home.

Figure 9:
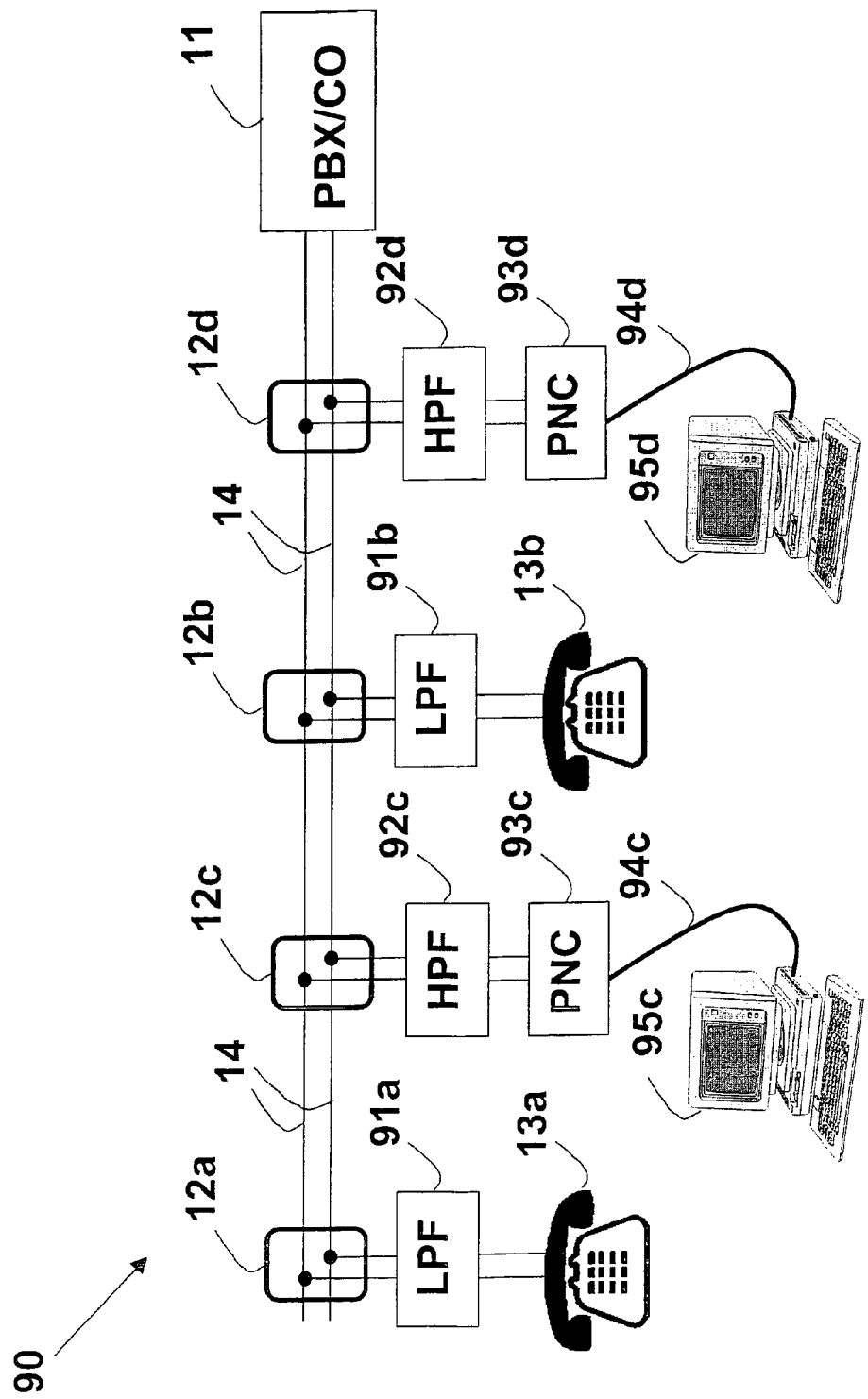
FIG. 9 is a schematic diagram illustrating a prior-art scheme for providing data communication over telephone lines.

It should be noted that in systems according to the invention, the AC signal carried over the wiring is unaffected by the DC signal, so that phoneline-based data communication, which uses the high frequency spectrum, is not degraded. An example of a prior-art HomePNA system 90 is shown in FIG. 9. Low Pass Filters (LPF) 91*a* and 91*b* are connected in series with telephone sets 13*a* and 13*b* respectively, in order to avoid interference and loading in the frequency spectrum used by the data communication signals. Computers 95*c* and 95*d* (or any other data units) can communicate using the HomePNA technology using Phoneline Communication modems (PNC) 93*c* and 93*d*, respectively. Modems 93*c* and 93*d* communicate over phoneline wiring 14 via High Pass Filters (HPF) 92*c* and 92*d*, respectively, which avoid interference with the telephony signal using the lower spectrum. PNCs 93*c* and 93*d* connect to computers 95*c* and 95*d*, respectively, via respective connections 94*c* and 94*d*, commonly standard data interface protocols (e.g. USB, Ethernet10/100BaseT).

Each PNC 93 comprises active circuits, and as such requires power for its operation. This power may be supplied by a computer 95, which is usually the case wherein a PNC 93 is integrated into a computer 95, or supplied via a link 94, such as in the case of a USB (Universal Serial Bus) connection. However, in many cases a PNC 93 (commonly integrating an HPF 92) is a stand-alone unit, being powered from the AC utility mains (not shown in FIG. 9). This involves complex installation requiring many connections to be made. Such complexity can be avoided, according to the present invention, wherein the telephone wiring is used also to carry the power required for the PNC 93 operation.

Figure 10:
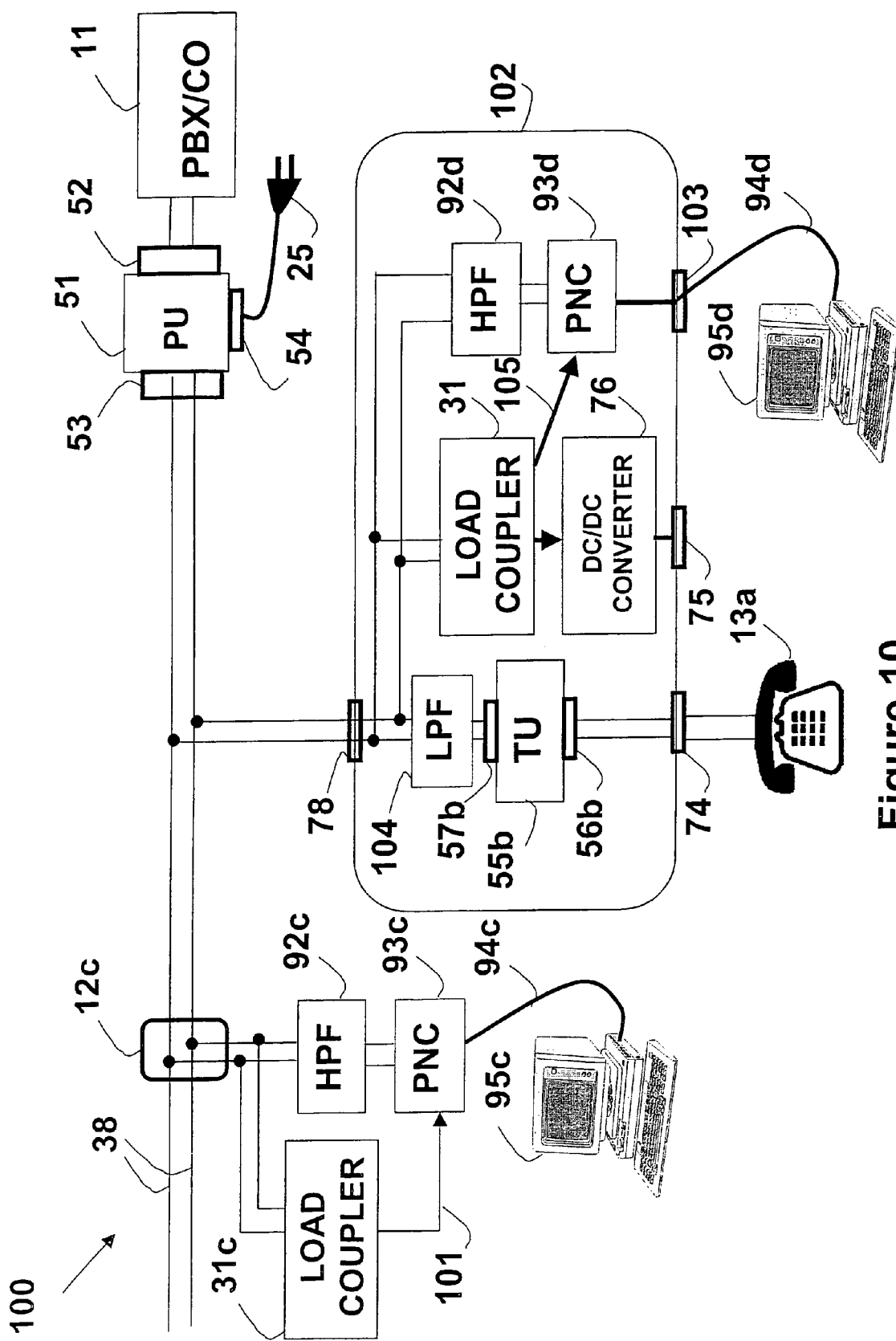
FIG. 10 is a functional block diagram illustrating a sample embodiment according to the present invention wherein the power is also used to power data communication circuitry.

A system 100 wherein a PNC 93 is fed via telephone wire 38 according to the invention is shown in FIG. 10. PNC 93*c* is shown to connect to computer 95*c* via link 94*c*. PNC 93*c* allows for networking over telephone wiring 38 and is connected thereto via HPF 92*c* and telephone outlet 12*c*. A load coupler 31*c* is also connected to outlet 12*c*, and its power output is used to power PNC 93*c* via link 101. In such a configuration, there is no need for any additional power supply or connection to AC utility mains.

In order to reduce the complexity of installation and use, and also to save space and wiring, it has been suggested to integrate PNC 93 into a telephone outlet. Such outlet is described in the patent document WO 01/71980 entitled: "Telephone outlet and system for a local area network over telephone lines" in the name of the present Applicant. In such a configuration, it is preferred to also integrate the PNC powering functions into the outlet as well. Such an outlet 102 is shown in FIG. 10 as part of system 100. Outlet 102 is based on outlet 77 shown in FIG. 7, modified to include the PNC functionality. Telephone support via interface 74 using TU 55*b* is maintained, wherein LPF 104, which blocks data signals is added in series to TU 55*b* in order to avoid loading and interference with the data networking signals. Powering of external units via interface 75 is also provided. PNC 93*d* (together with HPF 92*d*) is also included in outlet 102, allowing for data devices such as computer 95*d* to connect thereto via port 103 and link 94*d*. Port 103 is preferably a standard data communication interface such as an Ethernet IEEE802.3 10/100BaseT or USB. As shown in FIG. 10, PNC 93*d* is powered by load coupler 31, via connection 105, thus obviating the need for a dedicated power supply.

Figure 11:
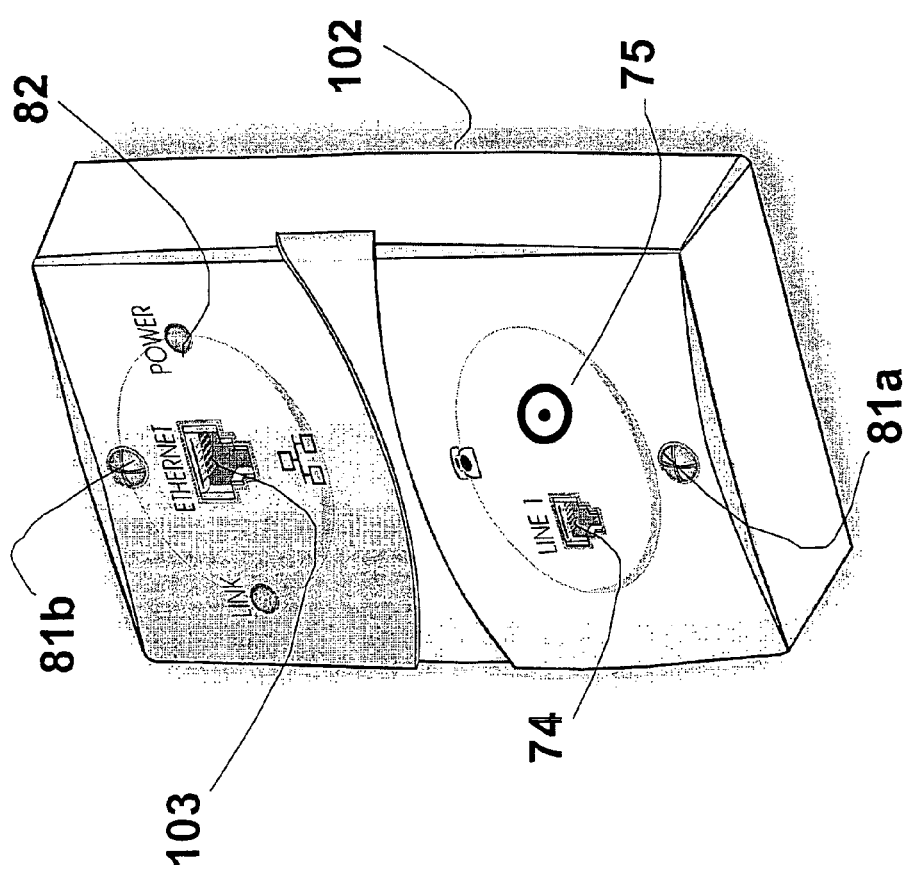
FIG. 11 is another pictorial view of an outlet according to the present invention.

A pictorial view of outlet 102 is shown in FIG. 11. Added to the outlet of FIG. 8 is interface 103, shown as an RJ-45 connector, commonly used for IEEE802.3 10/100BaseT connection.

While outlet 102 is configured to support three distinct ports: Telephone set interface 74, power feeding interface 75 and data unit port 103, it is understood that any subset of one or two ports can also be implemented according to the present invention.

In addition to feeding a PNC 93 integrated into the outlet, the power supplied by a load coupler 31 can also be used to power other functions within the outlet, networked to PNC 93*d*. For example, patent document WO 01/80543 in the name of the present Applicant discloses a RF transceiver integrated into an outlet and patent document WO 01/80595 also in the name of the present Applicant discloses a telephone switching network using outlets. In all such cases, the circuits integrated into the outlet can be powered as well by load coupler 31.

Implementation

Figure 12:
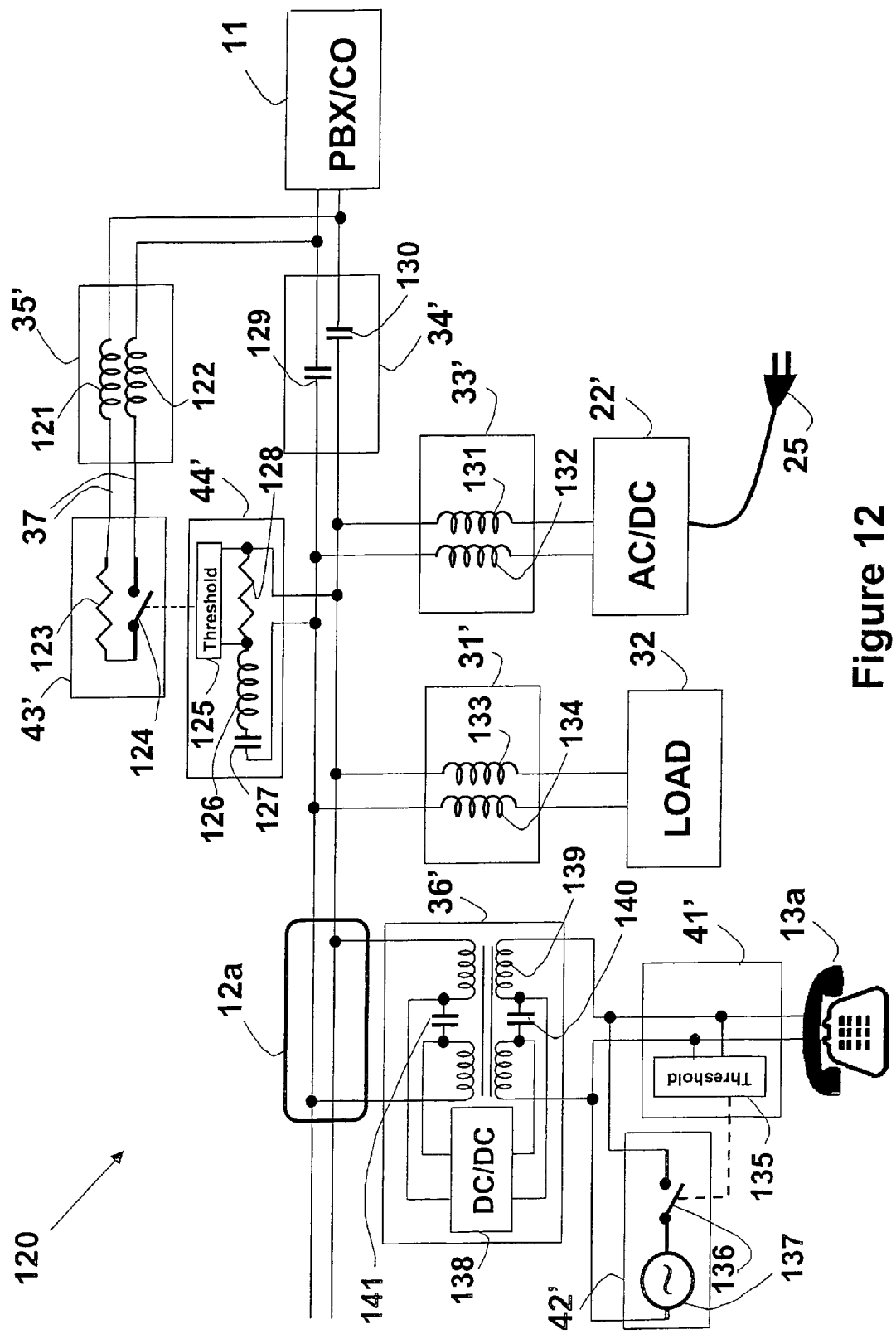
FIG. 12 is a diagram showing a specific exemplary embodiment of the present invention.

System 120 in FIG. 12 includes specific exemplary components for implementing system 40 shown in FIG. 4, as well as the other embodiments disclosed herein. DC Pass/AC Stop unit 35' shown is a sample embodiment of equivalent unit 35 in system 40. As shown, inductors 121 and 122 are used to stop the AC signal, while passing the DC signal, as known in the art. In order to obtain better results, a gyrator circuit (active inductor) may be used. Off-Hook simulator 43' shown is a sample embodiment of equivalent unit 43 in system 40. Resistor 123 is shown, operative to allow a DC current flow when switch 124 is closed, thus simulating the off-hook DC current to PBX/CO 11. Most PBX/CO's 11 require 20 milliamp `ures` as an Off-Hook indication signal; thus assuming a DC level of 48 VDC, resistor 123 should have a resistance of 48/0.020=2400 ohms. Switch 124 is operated by a threshold detector 125, which measures the voltage across resistor 128. In some cases an optical coupler is recommended for use as part of switch 124 and threshold detector 125, allowing for galvanic isolation. Capacitor 127 in series with inductor 126 serves as a Band Pass Filter (BPF) for passing the Off-Hook tone, while blocking and not loading all other signals. A notch filter is also recommended for such BPF. In one preferred embodiment, a tone of 18 KHz is used as the Off-Hook signaling tone, being separated sufficiently from the telephony spectrum of 300-4000 Hertz and also separated sufficiently from ADSL signals starting at a lower frequency limit of 100 KHz. As such, the BPF allows for the tone to pass and generate a current level in resistor 128 that allows for threshold detector 125 to operate switch 124.

Similar to AC Stop/DC Pass unit 35', Power Supply coupler 33' and load coupler 31', shown as a sample embodiment of the respectively equivalent units 33 and 31 in system 40, perform the function of passing the DC signal and stopping the AC signal. Power Supply coupler 33' is composed of inductors 131 and 132, and load coupler 31' is composed of a similar arrangement of inductors 133 and 134. Again, gyrator implementation of the inductors is preferable.

Telephone coupler 36' functions to pass the AC signal to telephone set 13a, and also receives DC from unit 22'. Telephone coupler 36' is a sample embodiment of coupler 36 in system 40. Coupler 36' makes use of a split center tap transformer 139. Capacitors 140 and 141 are connected to the center taps in both the primary and secondary transformer 139 windings, thus allowing the AC signal to pass through from outlet 12a to telephone set 13a. The DC power over the telephone wiring is extracted over capacitor 141, and injected to DC/DC converter 138. The DC/DC function to adapt the voltage level to the level required by telephone set 13a (typically −48 VDC). The output from DC/DC converter 138 is connected across capacitor 140, in order to combine it with the AC signal. DC/DC converter 138 may include other functions common to telephony such as current limit and output impedance.

Off-Hook detector 41', which is an example of detector 41 in system 40, is based on an under-voltage threshold detector 135. Upon telephone set 13a shifting into the Off-Hook state, the DC voltage over its terminals is reduced to less than 20 VDC. This voltage level is detected by under-voltage detector 135, which in turn closes switch 136 within Off Hook transmitter 42', which is an example of transmitter 42 in system 40. A tone (sine-wave) generator 136 provides the off-hook tone, which is imposed over the telephone wiring when the contacts of switch 135 close.

AC Pass/DC Stop unit 34', which is an example of AC Pass/DC Stop unit 34 in system 40, uses two capacitors 129 and 130 in order to block the DC signal and pass the AC signal.

All of the patent documents cited herein are incorporated herein by reference.

While the invention has been described with respect to imposing power over an active telephone line, it will be appreciated that the invention equally applies to any installation wherein a telephony connection is to be imposed over DC carrying wires.

While the invention has been described with respect to analog (POTS) telephony, it will be appreciated that the invention equally applies to ISDN (Integrated Services Digital Network) telephony, and to any case wherein limited DC power is used to power remotely wired connected units.

While the invention has been described with respect to in-house installations, it will be appreciated that the invention equally applies to any installation wherein active POTS telephone wiring is used, such as residential, offices, factories, enterprises or MDUs (Multi Dwelling Units), and may be either in-house or external to a house, or both.

While the invention has been described with respect to a limited number of embodiments, it will be appreciated that many variations, modifications, derivatives, combinations and other applications of the invention may be made.

What is claimed is:

1. A device for use with a wire pair connected for simultaneously carrying a power signal at a power signal frequency, the power signal having a higher power level than a DC telephone signal, and a bi-directional packet-based digital data signal in a digital data frequency band at least in part above an analog telephone frequency band and above the power signal frequency, said device being operative to couple the bi-directional packet-based digital data signal to a data unit, said device comprising:
   a wiring connector for connecting to the wire pair;
   a high pass filter coupled to said wiring connector for passing signals in the digital data frequency band;
   a modem coupled to said high pass filter for transmitting the bi-directional packet-based digital data signal to, and receiving the bi-directional packet-based digital data signal from, the wire pair;
   a bi-directional packet-based digital data port couplable to the data unit for coupling the bi-directional packet-based digital data signal to the data unit; and
   a single enclosure housing said wiring connector, said high pass filter, said modem, and said digital data port, wherein the modem is coupled to said wiring connector to be powered from the power signal.

2. The device according to claim 1, wherein the power signal is a DC power signal.

3. The device according to claim 2, wherein the power signal is a DC power signal having a voltage on the telephone wire pair that is distinct from a −48 volt DC analog telephone signal voltage, and said device further comprises a DC/DC voltage converter coupled between said wiring connector and said modem for converting the DC power signal voltage to a voltage proper for powering said modem.

4. The device according to claim 1, further operative to power a unit by the power signal, said device further comprising a power connector connectable to the unit and coupled to said wiring connector to receive the power signal from said wire pair, and connectable to supply at least part of the received power to the unit.

5. The device according to claim 1, wherein the wire pair is a telephone wire pair, said wiring connector is a telephone connector, and said modem is a telephone line modem.

6. The device according to claim 5, wherein the bi-directional digital data signal is a DSL-based signal and said telephone line modem is an xDSL modem, or the bi-directional digital data signal is a HomePNA signal and said telephone line modem is a HomePNA modem.

7. The device according to claim 5, wherein the telephone wire pair is a part of a subscriber loop.

8. The device according to claim 1, wherein the telephone wire pair is at least in part in walls of a residential building.

9. The device according to claim 1, wherein said single enclosure is: attachable to a support surface; or mountable to a wall of a building; or attachable to a wall opening or to an outlet cavity.

10. The device according to claim 1, wherein said single enclosure is a wall-mountable enclosure that is constructed to have at least one of the following:
   a form substantially similar to that of a standard outlet;

wall mounting elements substantially similar to those of a standard wall outlet;
a shape allowing direct mounting in an outlet opening or cavity; and
a form to at least in part substitute for a standard outlet.

11. The device according to claim 1, wherein communication of the bi-directional packet-based digital with the data unit is based on a wired medium, and said digital data port is a standard digital data connector.

12. The device according to claim 11, wherein the bi-directional packet-based digital communication with the data unit is based on IEEE802.3 standard 10BaseT or 100BaseT, and wherein the standard digital data connector is of RJ-45 type.

13. The device according to claim 11, wherein the bi-directional packet-based digital communication with the data unit is based on a Universal Standard Bus (USB), and the standard digital data connector is a USB connector.

14. The device according to claim 1, wherein: communication of the bi-directional packet-based digital with the data unit is based on a non-wired medium using Radio frequency (RF); said device further comprises a RF transceiver coupled between said bi-directional packet-based digital data port and said modem; and said RF transceiver is coupled to said wiring connector to be powered by the power signal.

15. The device according to claim 1, wherein: the wire pair further is connected for concurrently carrying at least an AC telephone signal; said device is further operative to couple the AC telephone signal to an analog telephone set; said device further comprises a telephone connector for connecting to the analog telephone set; and said telephone connector is coupled to said wiring connector for coupling the AC telephone signal to the analog telephone set.

16. The device according to claim 15, further comprising a current limiter coupled between said telephone connector and said wiring connector and operative to limit the current available to the analog telephone set.

17. The device according to claim 1, further comprising a low pass filter coupled to said wiring connector for passing only the power signal.

18. The device according to claim 17, wherein said low pass filter comprises an inductor or a gyrator.

* * * * *